US012784555B2

(12) United States Patent
Nishiike et al.

(10) Patent No.: US 12,784,555 B2
(45) Date of Patent: Nov. 3, 2026

(54) TACTILE SENSE PROVIDING APPARATUS AND TACTILE SENSE PROVIDING LAYER

(71) Applicant: SONY GROUP CORPORATION, Tokyo (JP)

(72) Inventors: Akihito Nishiike, Tokyo (JP); Takuya Yanagisawa, Tokyo (JP); Masahiro Sato, Tokyo (JP); Masaki Orihashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 78 days.

(21) Appl. No.: 18/839,802

(22) PCT Filed: Jan. 11, 2023

(86) PCT No.: PCT/JP2023/000361
§ 371 (c)(1),
(2) Date: Aug. 20, 2024

(87) PCT Pub. No.: WO2023/162490
PCT Pub. Date: Aug. 31, 2023

(65) Prior Publication Data
US 2025/0182596 A1 Jun. 5, 2025

(30) Foreign Application Priority Data
Feb. 28, 2022 (JP) ................................ 2022-029276

(51) Int. Cl.
*G08B 6/00* (2006.01)
*G06F 3/01* (2006.01)

(52) U.S. Cl.
CPC ................ *G08B 6/00* (2013.01); *G06F 3/016* (2013.01)

(58) Field of Classification Search
CPC ....................................................... G08B 6/00
(Continued)

(56) References Cited

U.S. PATENT DOCUMENTS 10,136,699 B1 * 11/2018 Tse ....................... A43B 17/026
2006/0143767 A1 * 7/2006 Yang ................... A41D 19/015
442/76
(Continued)

FOREIGN PATENT DOCUMENTS

JP 2000-112329 A 4/2000
JP 2011-508935 A 3/2011
(Continued)

OTHER PUBLICATIONS

International Search Report and Written Opinion of PCT Application No. PCT/JP2023/000361, issued on Apr. 4, 2023, 08 pages of ISRWO.

*Primary Examiner* — Jack K Wang
(74) *Attorney, Agent, or Firm* — CHIP LAW GROUP

(57) ABSTRACT

Provided is a tactile sense providing apparatus includes a base member and a tactile sense providing layer. The base member includes a fluid-inlet-and-outlet opening. The tactile sense providing layer forms a space between the base member and the tactile sense providing layer, the space accommodating therein fluid that flows into and out of the space through the fluid-inlet-and-outlet opening. The tactile sense providing layer includes a tactile sense providing film and a wall-formed base-member-fixed portion. The tactile sense providing film is deformed in response to the inflow or outflow of the fluid. The wall-formed base-member-fixed portion is fixed to the base member and surrounds the tactile sense providing film. The base-member-fixed portion exhibits a lower rate of deformation caused between before and after the fluid flows into the space than the tactile sense providing film.

11 Claims, 15 Drawing Sheets

(58) Field of Classification Search
USPC ........................................................ 340/407.1
See application file for complete search history.

(56) References Cited

U.S. PATENT DOCUMENTS

| | | | | |
|---|---|---|---|---|
| 2013/0002570 | A1 | 1/2013 | Ogg | |
| 2013/0192455 | A1* | 8/2013 | Leonard | B66F 3/35<br>92/90 |
| 2015/0277563 | A1* | 10/2015 | Huang | G06F 1/1694<br>715/702 |
| 2016/0221316 | A1* | 8/2016 | Yairi | B32B 25/08 |
| 2020/0093679 | A1* | 3/2020 | Sonar | G01L 5/228 |
| 2020/0272237 | A1* | 8/2020 | Dobson | G06F 3/0487 |
| 2022/0000379 | A1* | 1/2022 | Harada | A61B 5/0235 |
| 2022/0121285 | A1* | 4/2022 | Severgnini | A61B 5/0533 |
| 2022/0252475 | A1* | 8/2022 | Hussein | G01L 5/162 |
| 2025/0289104 | A1* | 9/2025 | Khalaf | B25B 23/147 |

FOREIGN PATENT DOCUMENTS

| | | | |
|---|---|---|---|
| JP | 2015-520455 | A | 7/2015 |
| WO | 2020/116010 | A1 | 6/2020 |

* cited by examiner

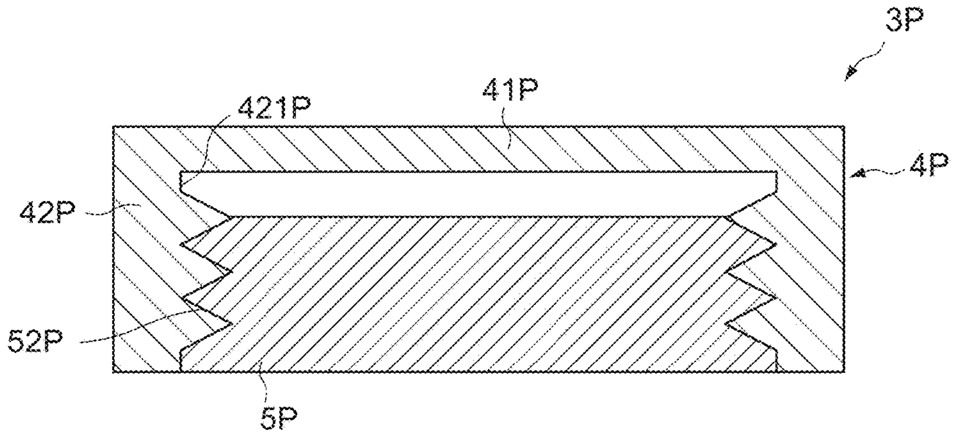
FIG. 14
FIG. 15A
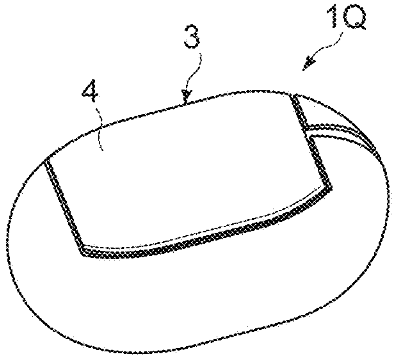
FIG. 15C
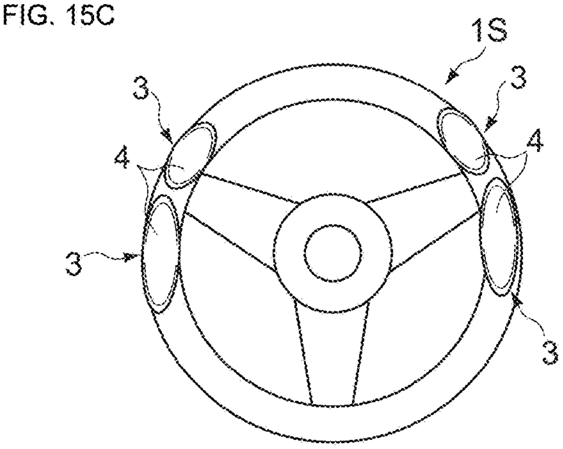
FIG. 15B
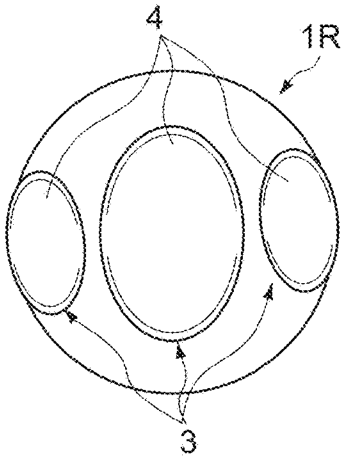
FIG. 15D
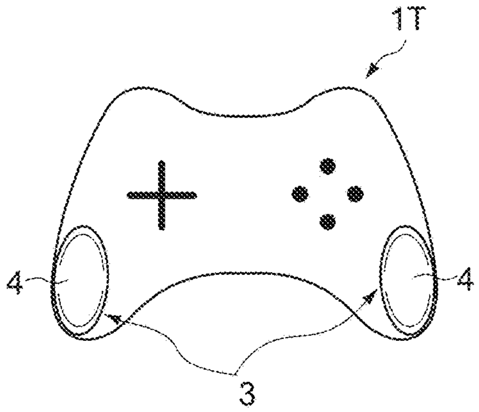

TACTILE SENSE PROVIDING APPARATUS AND TACTILE SENSE PROVIDING LAYER

CROSS REFERENCE TO RELATED APPLICATIONS

This application is a U.S. National Phase of International Patent Application No. PCT/JP2023/000361 filed on Jan. 11, 2023, which claims priority benefit of Japanese Patent Application No. JP 2022-029276 filed in the Japan Patent Office on Feb. 28, 2022. Each of the above-referenced applications is hereby incorporated herein by reference in its entirety.

TECHNICAL FIELD

The present technology relates to a tactile sense providing apparatus that provides a tactile sense to a user, and a tactile sense providing layer that is used in the tactile sense providing apparatus.

BACKGROUND ART

Conventionally, various tactile sense providing apparatuses that provide tactile senses to users.

For example, Patent Literature 1 discloses a user interface that includes a substrate and a tactile layer that includes a tactile surface, and deforms the tactile layer by moving fluid to a cavity between the substrate and the tactile layer. Accordingly, a tactile sense is provided.

CITATION LIST

Patent Literature

Patent Literature 1: Japanese Unexamined Patent Application Publication No. 2015-520455

DISCLOSURE OF INVENTION

Technical Problem

There is a need for a technology that makes it possible to provide a tactile sense to a user promptly in such a field of tactile sense provision.

In view of the circumstances described above, it is an object of the present technology to provide a tactile sense providing apparatus and a tactile sense providing layer that make it possible to provide a tactile sense to a user promptly.

Solution to Problem

A tactile sense providing apparatus according to the present technology includes a base member and a tactile sense providing layer.

The base member includes a fluid-inlet-and-outlet opening.

The tactile sense providing layer forms a space between the base member and the tactile sense providing layer, the space accommodating therein fluid that flows into and out of the space through the fluid-inlet-and-outlet opening.

The tactile sense providing layer includes a tactile sense providing film and a wall-formed base-member-fixed portion.

The tactile sense providing film is deformed in response to the inflow or outflow of the fluid.

The wall-formed base-member-fixed portion is fixed to the base member and surrounds the tactile sense providing film.

The base-member-fixed portion exhibits a lower rate of deformation caused between before and after the fluid flows into the space than the tactile sense providing film.

According to such a configuration, the tactile sense providing layer includes the tactile sense providing film relatively deformable in response to inflow or outflow of fluid, and the wall-formed base-member-fixed portion not easily deformable in response to inflow or outflow of fluid. Consequently, the tactile sense providing layer is primarily deformed in a tactile-sense-provision direction, and is not easily deformed in a direction other than the tactile-sense-provision direction. Accordingly, a rate of volume variation in the space due to fluid flowing into and out of the space can be reduced, and a tactile sense can be promptly provided in the tactile-sense-provision direction.

The space may be formed by the base member, the tactile sense providing film, and the base-member-fixed portion.

A portion of the wall-formed base-member-fixed portion that forms the space may be thicker than the tactile sense providing film.

The tactile sense providing layer may be formed by integral molding.

This makes it possible to enhance hermetic sealing of the tactile sense providing apparatus, and thus to more stably provide a tactile sense promptly.

The tactile sense providing layer may be bonded to be fixed to the base member by an inner wall surface of the wall-formed base-member-fixed portion and the base member being brought into contact with each other.

This results in contact surfaces of the base-member-fixed portion and the base member including the same direction component as the tactile-sense-provision direction. This makes it possible to make the area of the tactile sense providing film larger in proportion to the size of the tactile sense providing apparatus.

The tactile sense providing layer may be bonded to be fixed to the base member by a bottom surface of the wall-formed base-member-fixed portion and the base member being brought into contact with each other.

This makes it possible to make the area of bonding of the base member and the tactile sense providing layer larger to improve the bonding strength. This makes it possible to enhance hermetic sealing of the tactile sense providing apparatus, and thus to more stably provide a tactile sense promptly.

The base member may include a hole in a contact region in which the base member and the wall-formed base-member-fixed portion are in contact with each other, and the base member and the wall-formed base-member-fixed portion may be fixed to each other using an adhesive provided to the contact region.

This results in the adhesive entering the hole, and in being able to improve the strength of bonding of the base member and the wall-formed base-member-fixed portion due to anchor effects. This makes it possible to enhance hermetic sealing of the tactile sense providing apparatus, and thus to more stably provide a tactile sense promptly.

The tactile sense providing apparatus may further include a housing that accommodates therein a tactile sense providing module that includes the base member and the tactile sense providing layer. The wall-formed base-member-fixed portion may include a protrusion that protrudes outward in a direction of a thickness of the wall-formed base-member-fixed portion, the protrusion determining positions of the housing and the tactile sense providing module.

According to such a configuration, the protrusion provided to the wall-formed base-member-fixed portion makes it easy to determine the position of the tactile sense providing module relative to the position of the housing. In addition, when an external force from a user is applied to the tactile sense providing layer during use of the tactile sense providing apparatus, the existence of the protrusion prevents the tactile sense providing module from excessively sinking into the housing. This makes it possible to stably provide a tactile sense.

The tactile sense providing apparatus may include a plurality of the tactile sense providing modules, and the housing may accommodate therein the plurality of the tactile sense providing modules.

According to such a configuration, the protrusion provided to the wall-formed base-member-fixed portion makes it easy to determine the positions of the plurality of the tactile sense providing modules relative to the position of the housing. Consequently, the tactile sense providing modules of the plurality of tactile sense providing modules are arranged to have a desired positional relationship with each other. This makes it possible to desirably provide a tactile sense using the plurality of tactile sense providing modules.

The wall-formed base-member-fixed portion and the base member may be mated to each other using a screw structure.

A tactile sense providing layer according to the present technology is used in a tactile sense providing apparatus that includes a base member that includes a fluid-inlet-and-outlet opening, and the tactile sense providing layer forming a space between the base member and the tactile sense providing layer, the space accommodating therein fluid that flows into and out of the space through the fluid-inlet-and-outlet opening.

In a state of being included in the tactile sense providing apparatus, the tactile sense providing layer includes

- a tactile sense providing film that is deformed in response to the inflow or outflow of the fluid, and
- a wall-formed base-member-fixed portion that is fixed to the base member and surrounds the tactile sense providing film.

The base-member-fixed portion exhibits a lower rate of deformation caused between before and after the fluid flows into the space than the tactile sense providing film.

BRIEF DESCRIPTION OF DRAWINGS

FIG. 9A is a schematic cross-sectional view that corresponds to a region indicated by being surrounded by a dashed ellipse IX illustrated in FIG. 6B, and to a portion in which a hole is situated in a base member, and FIG. 9B is a schematic cross-sectional view that corresponds to a portion in which the hole is not situated in the base member.

FIG. 14 is a schematic cross-sectional view used to describe how to mate a tactile sense providing module according to a third embodiment of the present technology.

FIGS. 15A, 15B, 15C, and 15D are diagrams used to describe examples of applying tactile sense providing apparatuses.

MODE(S) FOR CARRYING OUT THE INVENTION

Figure 1:
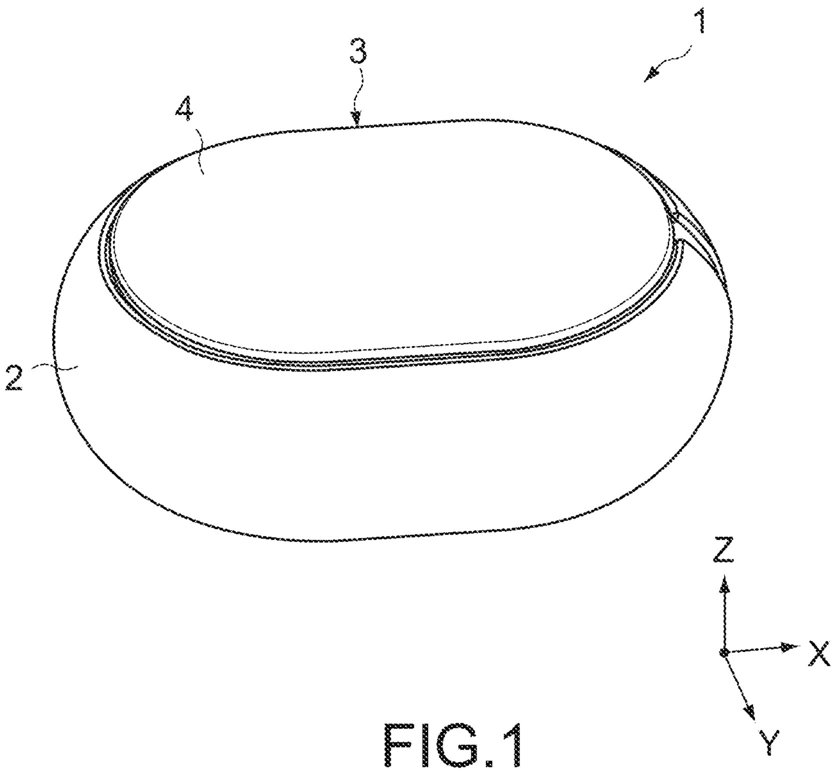
FIG. 1 is a perspective view of a tactile sense providing apparatus according to a first embodiment of the present technology.

Embodiments according to the present technology will now be described below with reference to the drawings. In the following description, similar structural elements are denoted by similar reference numerals, and a description of an already described structural element may be omitted.

First Embodiment

[Schematic Overall Configuration of Tactile Sense Providing Apparatus]

FIG. 1 is a perspective view of a tactile sense providing apparatus 1 according to a first embodiment of the present technology.

Figure 2:
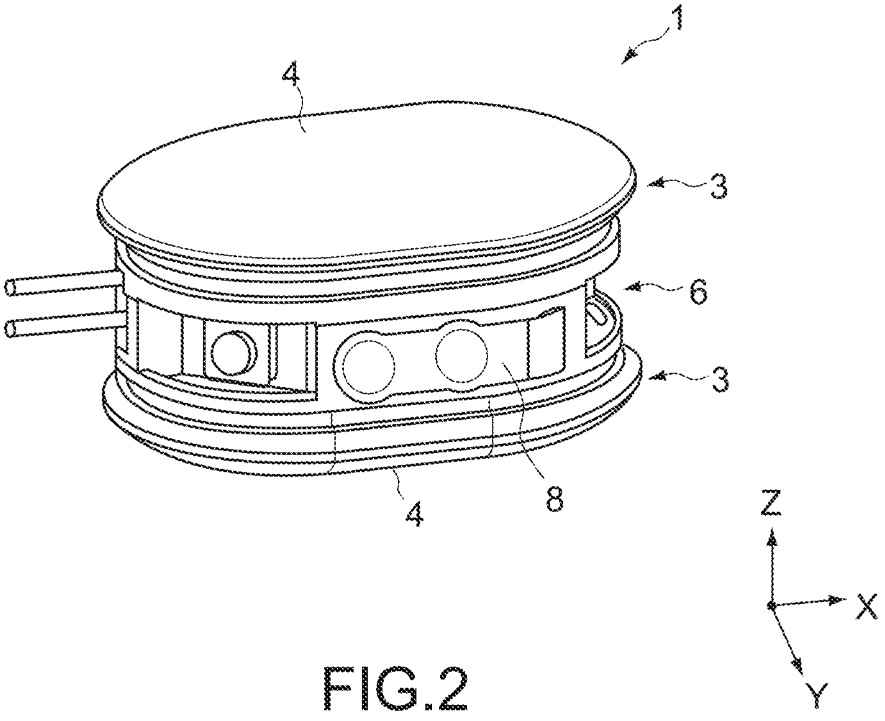
FIG. 2 is a perspective view of the tactile sense providing apparatus from which a housing of the tactile sense providing apparatus has been removed.

FIG. 2 is a perspective view of the tactile sense providing apparatus 1 from which a housing of the tactile sense providing apparatus 1 has been removed.

In the figures, a direction of a height of the tactile sense providing apparatus 1 is defined as a Z axis, and axes that are each orthogonal to the Z axis are respectively defined as an X axis and a Y axis. As used herein, the tactile sense providing apparatus 1 as viewed from the height direction Z is referred to as the tactile sense providing apparatus 1 in the plan view. The tactile sense providing apparatus 1 according to the present embodiment has a shape of an ellipse in the plan view, where a direction of a major axis of the ellipse corresponds to an X-axis direction, and a direction of a minor axis of the ellipse corresponds to a Y-axis direction.

Further, in use of the tactile sense providing apparatus, a side of each structural element that is situated closer to a skin of a user may be referred to as a skin side or an upper side, and a side opposite to the skin side or the upper side may be referred to as a non-skin side or a lower side.

In the case of the tactile sense providing apparatus according to the present embodiment, a tactile-sense-provision direction is substantially parallel to the height direction Z. In the present embodiment, an "inner side in the height direction Z" refers to a side that is reached with movement from the outside to the inside of a tactile sense providing module in a direction that is substantially parallel to the tactile-sense-provision direction (a side that is reached with movement from a tactile sense providing film to a base member). An "outer side in the height direction Z" refers to a side that is reached with movement from the inside to the outside of the tactile sense providing module in the direction substantially parallel to the tactile-sense-provision direction (a side that is reached with movement from the base member to the tactile sense providing film).

The tactile sense providing apparatus 1 is sized and shaped to be manually holdable. The tactile sense providing apparatus 1 is elliptic in the plan view, and has a side face that is curved to be bulging in a center portion of the side face in the height direction Z. Note that an example in which a tactile sense is provided to a hand of a user using the tactile sense providing apparatus 1 is described in the present embodiment. However, a body part that is a tactile-sense-provision target is not limited to the hand. Further, the size and the shape of the tactile sense providing apparatus can be set as appropriate according to the application of the tactile sense providing apparatus or according to a tactile-sense-provision-target body part. Other examples will be described later.

As illustrated in FIGS. 1 and 2, the tactile sense providing apparatus 1 includes a pair of tactile providing modules 3, a control module 6 that is situated between the pair of tactile providing modules 3, and a housing 2.

Together with an actuator 9 described later, the tactile sense providing module 3 is included in a provision section that provides a tactile sense to a user U.

The tactile sense providing module 3 includes a tactile sense providing layer 4 and a base member 5.

The tactile sense providing layer 4 and the base member 5 form a space (denoted by reference numeral 7 illustrated in FIG. 6B described later) into and out of which fluid can flow. In the tactile sense providing apparatus 1, the volume in the space 7 is changed in response to fluid flowing into and out of the space 7, and the tactile sense providing layer 4 is deformed. Accordingly, a tactile sense such as a sense-of-pressure stimulus is provided to a skin of the user U.

In the tactile sense providing module 3, the tactile sense providing layer 4 is provided to cover the base member 5.

The tactile sense providing layer 4 expands to mostly stretch toward the outer side in the height direction Z in response to fluid flowing into the space 7. This results in providing a sense of pressure to a user's body part (a hand in the present embodiment) in touch with the tactile sense providing layer 4. As used herein, a direction in which the tactile sense providing layer 4 expands may be referred to as the tactile-sense-provision direction. In the case of the tactile sense providing apparatus 1 according to the present embodiment, the tactile-sense-provision direction is substantially parallel to the height direction Z.

Note that, in the case of the tactile sense providing apparatus, the tactile-sense-provision direction does not necessarily correspond to the direction of the height of the tactile sense providing apparatus. Depending on, for example, a shape of the base member of the tactile sense providing module, or a shape of the tactile sense providing layer, the tactile-sense-provision direction does not necessarily have to correspond to the direction of the height of the tactile sense providing apparatus. The present technology can also be applied to a tactile sense providing module having such a configuration. For example, in the tactile-sense providing module including the base member including a spherical surface and the tactile sense providing layer provided to cover the spherical surface, the tactile-sense-provision direction radially extends along the spherical surface.

Fluid accommodated in the space 7 may be gas such as air or helium, or may be liquid such as water or oil. Note that the type of fluid is not particularly limited, and various types of fluid may be used.

A pressure sensor 8 is provided to the control module 6. The pressure sensor 8 is a detector that detects a force of the user U.

The housing 2 accommodates therein the control module 6 and two tactile sense providing modules 3.

The control module 6, the housing 2, and the tactile sense providing module 3 will be described in detail later.

[Control-Related Configuration of Tactile Sense Providing Apparatus]

Figure 3:
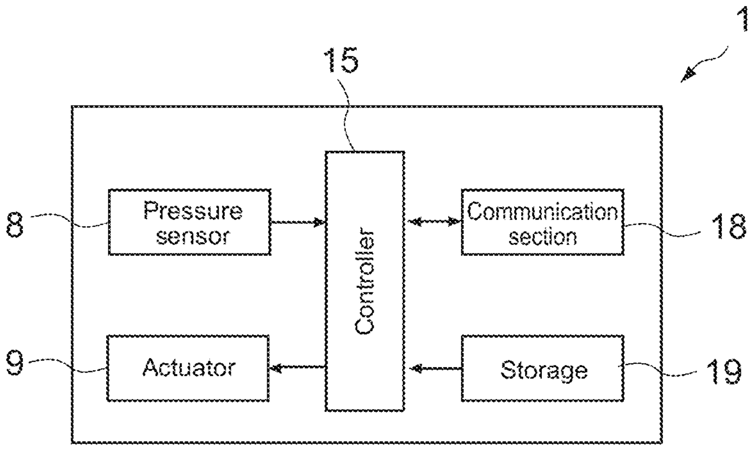
FIG. 3 is a block diagram schematically illustrating a control-related internal configuration of the tactile sense providing apparatus.

FIG. 3 is a block diagram illustrating a control-related internal configuration of the tactile sense providing apparatus 1.

As illustrated in FIG. 3, the tactile sense providing apparatus 1 includes the pressure sensor 8, the actuator 9, a controller 15, a communication section 18, and a storage 19.

The controller 15 performs various calculations on the basis of various programs stored in the storage 19, and comprehensively controls each structural element of the tactile sense providing apparatus 1.

The controller 15 is implemented by hardware or a combination of hardware and software. The hardware is a portion of or all of the controller 15, and examples of the hardware include a central processing unit (CPU), a digital signal processor (DSP), a field programmable gate array (FPGA), an application-specific integrated circuit (ASIC), and a combination of at least two thereof.

The pressure sensor 8 is a detector that detects a force of the user U that is generated when the user U grasps the tactile sense providing apparatus 1. Typically, the pressure sensor 8 may be provided at any position that is different from a position of the tactile sense providing module 3 serving as the provision section and at which the grasping force of the user can be detected properly. The pressure sensors 8 may be provided separately from each other to the tactile sense providing apparatus 1.

The actuator 9 is driven by control performed by the controller 15 to control flows of fluid into and out of the space 7.

The actuator 9 is attached to a pipe (not illustrated) that connects the space 7 and a fluid supplying source (not illustrated). The actuator 9 is driven to control flows of fluid into and out of the space 7. Examples of the actuator 9 include various actuators such as a pump, a fan, a blower, and a valve, and the actuator 9 may have any configuration.

The fluid supplying source can supply fluid to the space 7 using the pipe. For example, when fluid to be used is air, the fluid supplying source may be a source of compressed air pressure, such as an air compressor. Further, when fluid to be used is liquid such as water, or when fluid to be used is a special gas (such as helium) other than air, the fluid supplying source may be, for example, a tank that can store therein fluid.

The storage 19 includes a nonvolatile memory and a volatile memory. The nonvolatile memory stores thereon various programs necessary for the controller 15 to perform processing, and various data. The volatile memory is used as a working region for the controller 15. Note that the various programs described above may be read from a portable recording medium such as an optical disk or a semiconductor memory, or may be downloaded from, for example, a server apparatus in a network.

The communication section 18 is configured such that the tactile sense providing apparatus 1 can communicate with another apparatus such as another tactile sense providing apparatus wirelessly or by wire. The tactile sense providing apparatus 1 may communicate directly with the other apparatus, or may communicate with indirectly with the other apparatus through yet another apparatus such as a server apparatus situated in a network.

[Configuration of Control Module]

As illustrated in FIG. 2, the control module 6 is provided between the paired tactile sense providing modules 3 spaced from each other in the height direction Z to face each other.

The control module 6 includes the fluid supplying source (not illustrated) supplying fluid to the space 7, the actuator 9 serving as a drive section that controls flows of fluid into and out of the space 7, the pipe (not illustrated) connecting the space 7 and the fluid supplying source, and the pressure sensor 8.

Flows of fluid into and out of the spaces 7 in two tactile sense providing modules 3 may be controlled separately or together. It is favorable that the respective tactile sense providing modules 3 be controlled separately, in order to provide various tactile senses.

[Configuration of Housing]

The tactile sense providing apparatus 1 is shaped such that an external force applied toward the inner side in the height direction Z is easily applied to each tactile sense providing module 3 by the user U grasping the tactile sense providing apparatus 1.

The housing 2 is provided in the form of a frame to surround the control module 6, and protects the control module 6 and a portion of the tactile sense providing module from the outside. In addition, the housing 2 includes a function of determining positions of the tactile sense providing module 3 and the housing 2 upon assembling the tactile sense providing apparatus 1, and a function of preventing the tactile sense providing module 3 from excessively sinking into the housing 2 toward the inner side in the height direction Z. The details will be described later.

[Configuration of Tactile Sense Providing Module]

Figure 6A:
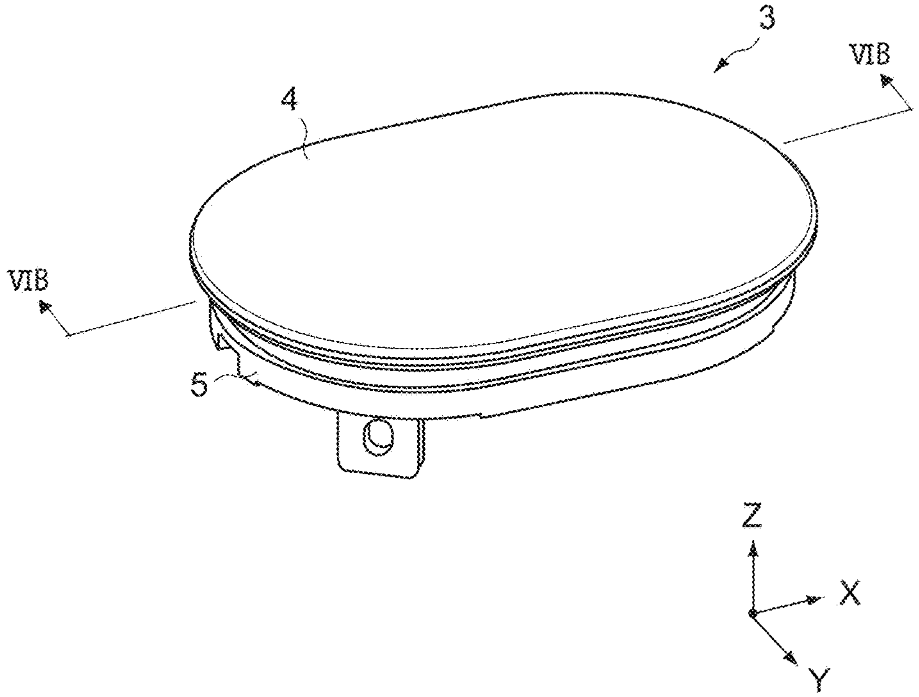
FIG. 6A is a perspective view of a tactile sense providing module that is a portion of the tactile sense providing apparatus.

FIG. 6A is a perspective view of the tactile sense providing module 3 that is a portion of the tactile sense providing apparatus 1.

Figure 6B:
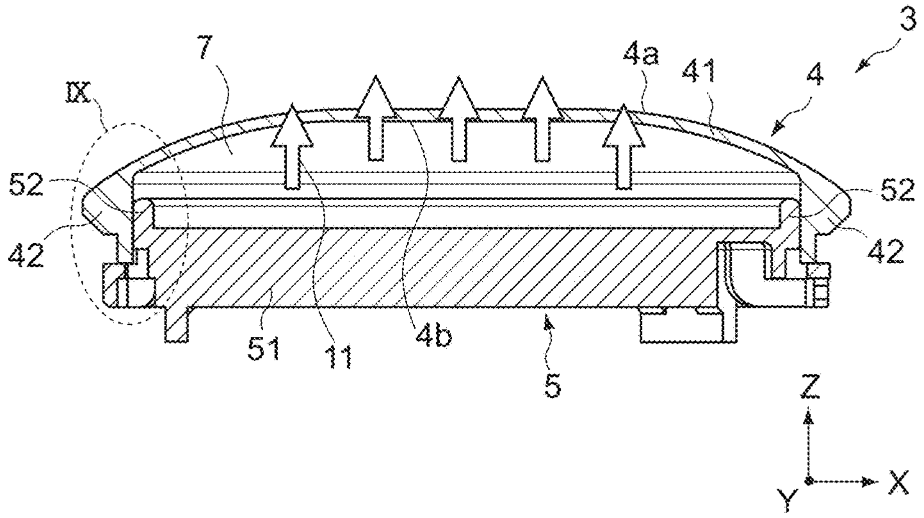
FIG. 6B is a schematic cross-sectional view along the line VIB-VIB illustrated in FIG. 6A.

FIG. 6B is a schematic cross-sectional view along the line VIB-VIB illustrated in FIG. 6A.

Figure 7:
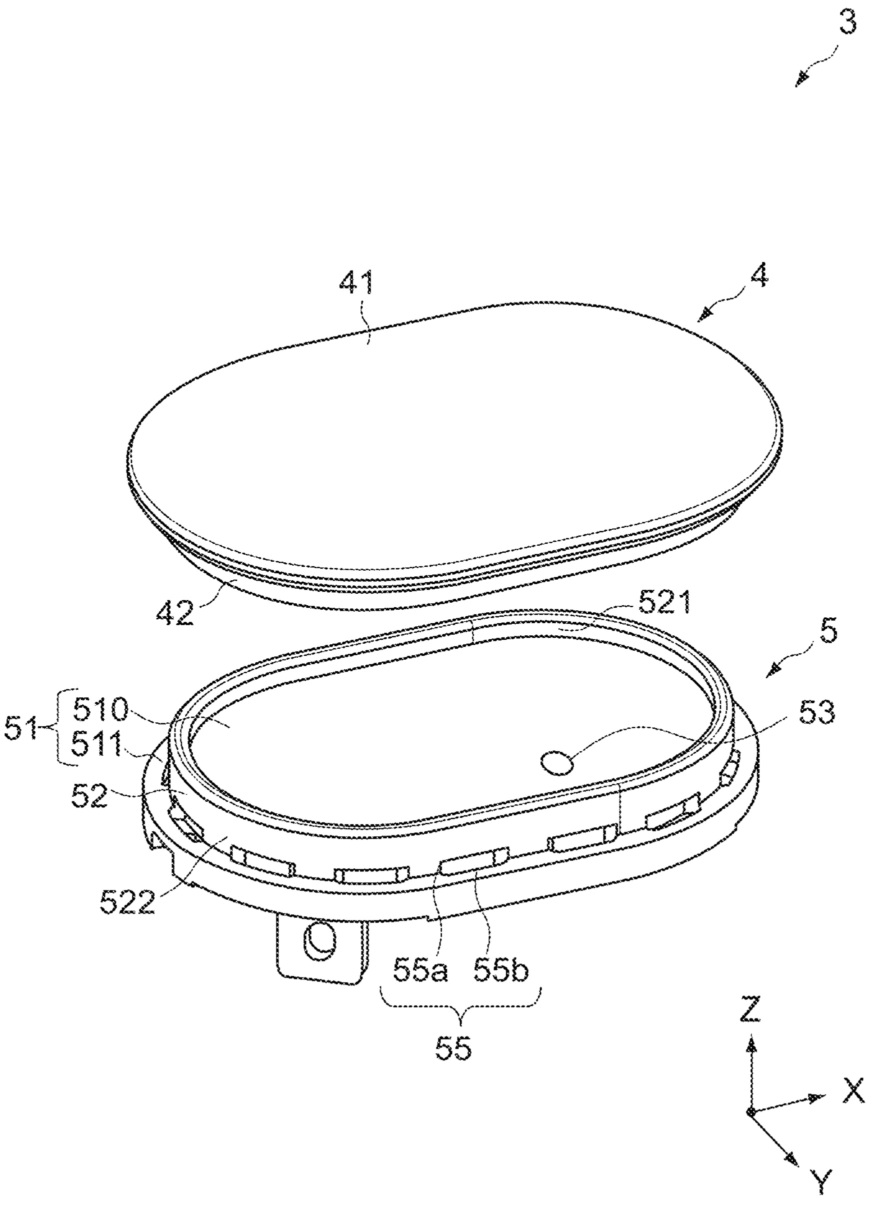
FIG. 7 is an exploded perspective view of the tactile sense providing module.

FIG. 7 is an exploded perspective view of the tactile sense providing module 3.

As illustrated in FIGS. 6A, 6B, and 7, the tactile sense providing module 3 includes the tactile sense providing layer 4 and the base member 5.

The tactile sense providing layer 4 and the base member 5 form the space 7 into and out of which fluid can flow. An inflow-and-outflow opening 53 for inflow and outflow of fluid is provided to the base member 5, and fluid flows into and out of the space 7 through the inflow-and-outflow opening 53.

Figure 4:
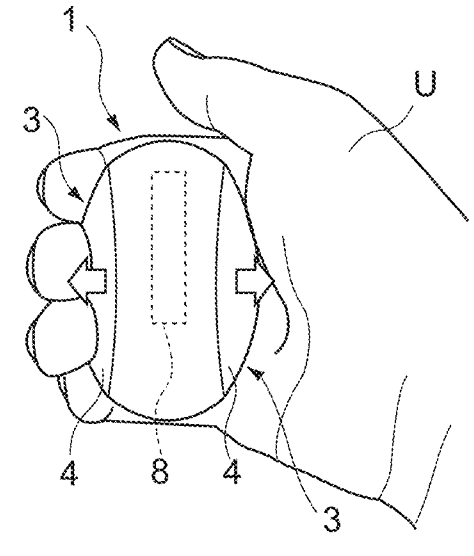
FIG. 4 is a perspective view illustrating a state in which a user is holding the tactile sense providing apparatus.

As illustrated in FIG. 4, the tactile sense providing apparatus 1 in use is held by the user U with his/her hand. In the tactile sense providing apparatus 1, the volume in the space 7 is changed in response to fluid flowing into and out of the space 7, and the tactile sense providing layer 4 is deformed. Accordingly, a sense-of-pressure stimulus can be provided to the hand of the user U.

In particular, the tactile sense providing layer 4 can expand (protrude) outward by stretching in response to fluid flowing into the space 7. Such an expansion of the tactile sense providing layer 4 results in providing a sense-of-pressure stimulus to the hand of the user. Further, when the tactile sense providing layer 4 shrinks in response to fluid flowing out of the space 7, the tactile sense providing layer 4 can shrink and return to its original state from the state of having expanded outward.

Such control performed on flows of fluid into and out of the space 7 makes it possible to provide a sense-of-pressure stimulus to a portion of the skin of the user U that is in contact with the tactile sense providing layer 4, and to provide a tactile sense such as a sensation of pressure, or a stiff or soft feeling. For example, the adjustment of pressure in the space 7 makes it possible to adjust a degree of stiffness to be provided.

As illustrated in FIGS. 1, 2, 6A, and 6B, the tactile sense providing apparatus 1 includes two tactile sense providing modules 3 spaced from each other to face each other. In the tactile sense providing module 3, the base member 5 partially forming the space 7 includes a planar surface that is parallel to an X-Y plane, and the tactile sense providing layer 4 is provided to cover the planar surface. The tactile sense providing apparatus 1 is configured such that the tactile-sense-provision directions of the two tactile sense providing modules 3 are about 180 degrees from each other. Note that the number of and an arrangement of the tactile sense providing modules provided to the tactile sense providing apparatus can be set as appropriate according to the application of the tactile sense providing apparatus or according to a tactile-sense-provision-target body part.

A tactile sense providing film 41 (that will be described in detail later) that corresponds to a region, in the tactile sense providing layer 4, that contributes toward providing a tactile sense, is a thin film, and can be deformed in response to fluid flowing into and out of the space 7.

Typically, various kinds of rubber such as silicon rubber and natural rubber are used as a material used for the tactile sense providing layer 4, in consideration of properties of expansion and shrinkage. Note that it is sufficient if the tactile sense providing layer 4 can be deformed (can expand or shrink) in response to fluid flowing into and out of the space 7, and the tactile sense providing layer 4 may be made of an elastic body material other than rubber.

When the tactile sense providing layer 4 brought into direct contact with a skin of a user is made of an elastic body, a feeling that causes the user to feel as if the user is in touch with a real human skin can be easily provided to the user upon using the tactile sense providing apparatus. The tactile sense providing apparatus is suitable for use as a communication device used for communication between people.

A resin material, such as acrylonitrile butadiene styrene resin (ABS resin), polymethyl methacrylate resin (PMMA resin), polybutylene terephthalate resin (PBT resin), or polycarbonate resin, that does not easily expand or shrink according to a change in the volume in the space 7 that is caused in response to fluid flowing into and out of the space 7, or a rigid material such as metal including A1050 (aluminum), C1020 (oxygen-free copper), and C1100 (tough-pitch copper) can be used as the base member 5. Note that the base member 5 may be made of an elastic body that is a material similar to the material of the tactile sense providing layer 4. In this case, the base member 5 is formed to have a thickness with which the base member 5 does not expand or shrink according to a change in the volume in the space 7 that is caused in response to fluid flowing into and out of the space 7.

(Details of Base Member) The base member 5 is described with reference to FIGS. 6A, 6B, 7, 9A, and 9B.

Figure 9A:
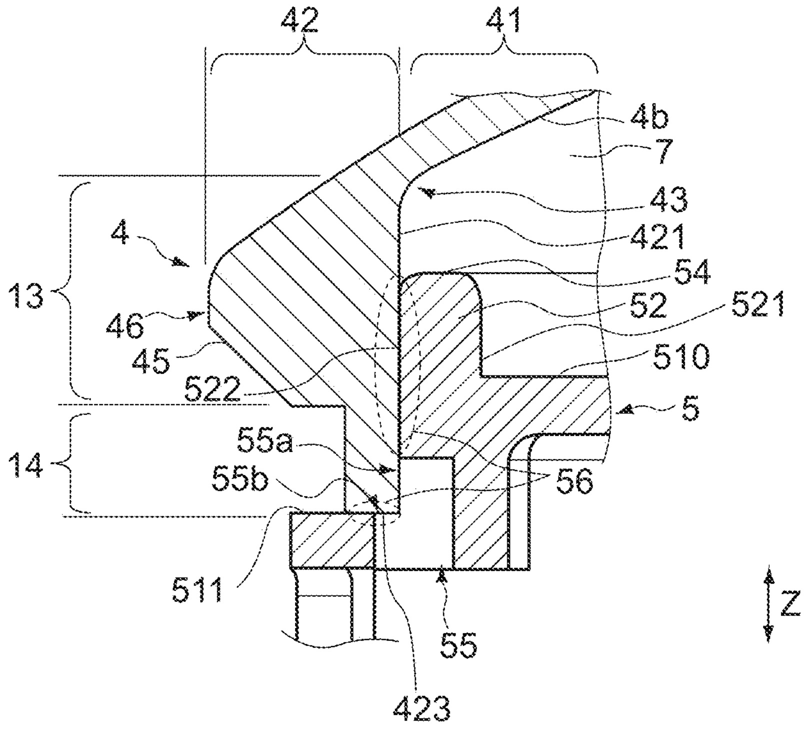
FIGS. 9A and 9B are set of partial cross-sectional views of a region of a peripheral edge of the tactile sense providing module, where
Figure 9B:
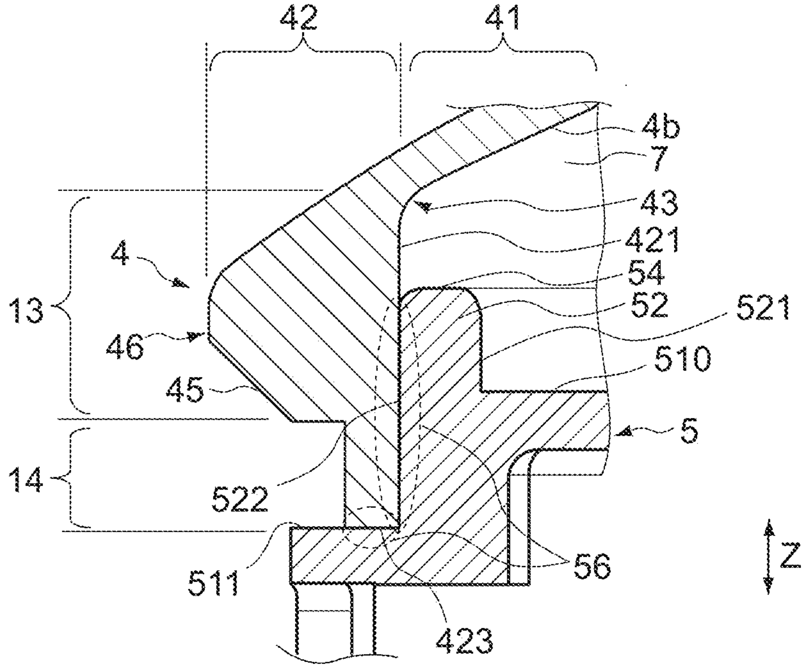

FIGS. 9A and 9B are partial cross-sectional views of the tactile-sense providing module 3 that are used to describe how the base member 5 and tactile sense providing layer 4 are bonded to be fixed to each other. FIG. 9A corresponds to an enlarged view of a region indicated by being surrounded by a dashed ellipse IX illustrated in FIG. 6B. FIGS. 9A and 9B are both partially enlarged cross-sectional views of a region of a peripheral edge of the tactile-sense providing module 3. FIG. 9A is a cross-sectional view of a region in which there is a hole 55 that is provided to the base member 5 and will be described later, and FIG. 9B corresponds to a cross-sectional view of a region in which there is not the hole 55.

The base member 5 is indicated by upward-sloping lines in each of the cross-sectional views illustrated in FIGS. 6B and 9B.

The base member 5 includes a base 51 and a wall 52.

The base 51 is elliptic in the plan view. The base 51 includes an inner region 510 that is situated in a region surrounded by the wall 52, and a frame region 511 that is situated further outward than the wall 52.

The inner region 510 and the frame region 511 respectively have substantially planar surfaces that are each substantially parallel to the X-Y plane. The inner region 510 and the frame region 511 may be situated in the same X-Y plane or in different X-Y planes. In the present embodiment, a skin-side surface of the inner region 510 is situated on the outer side in the height direction Z (an upper direction in the figure), as viewed from a skin-side surface of the frame region 511, and thus the inner region 510 and the frame region 511 are situated in different X-Y planes, as illustrated in FIGS. 9A and 9B.

As illustrated in FIGS. 7 and 9B, a plurality of bottom holes 55*b* intermittently arranged along an outer periphery of the wall 52 is provided to the frame region 511 of the base 51. In the present embodiment, the bottom hole 55*b* is provided in the form of a through-hole that passes through the frame region 511 in the height direction Z. However, the bottom hole 55*b* may be a concave portion that does not pass through the frame region 511, the concave portion being obtained by recessing the frame region 511 in a direction from the skin-side surface of the frame region 511 to a non-skin-side surface of the frame region 511.

The wall 52 is provided to protrude toward the outer side in the height direction Z from the base 51. The wall 52 is provided to be substantially vertical to the base 51.

The wall 52 is provided along a peripheral edge of the base 51 to be situated slightly further inward than the peripheral edge. Consequently, the frame region 511 projecting outward from the wall 52 is provided to a region of a peripheral edge of the base member 5.

The wall 52 includes an inner wall surface 521, an outer wall surface 522, and an upper surface 54.

As illustrated in FIGS. 7 and 9B, a plurality of wall holes 55*a* intermittently arranged along the outer periphery of the wall 52 is provided to the wall 52. In the present embodiment, the wall hole 55*a* is provided in the form of a concave portion obtained by recessing the wall 52 in a direction from the outer wall surface 522 to the inner wall surface 521, without passing through the wall 52 in a direction of a thickness of the wall 52 (a direction vertical to the height direction Z). However, the wall hole 55*a* may be in the form of a through-hole that passes through the wall 52 in the direction of the thickness of the wall 52.

In the present embodiment, the wall hole 55*a* and the bottom surface hole 55*b* are connected to each other to form the hole 55, as illustrated in FIGS. 7 and 9B.

In the tactile sense providing module 3, the skin-side surface of the inner region 510, the inner wall surface 521 of the wall 52, and the upper surface 54 of the wall 52 are surfaces that are brought into contact with the space 7, that is, surfaces that contribute toward forming the space 7.

(Details of Tactile Sense Providing Layer)

The tactile sense providing layer 4 is described with reference to FIGS. 6A, 6B, and 8.

Figure 8:
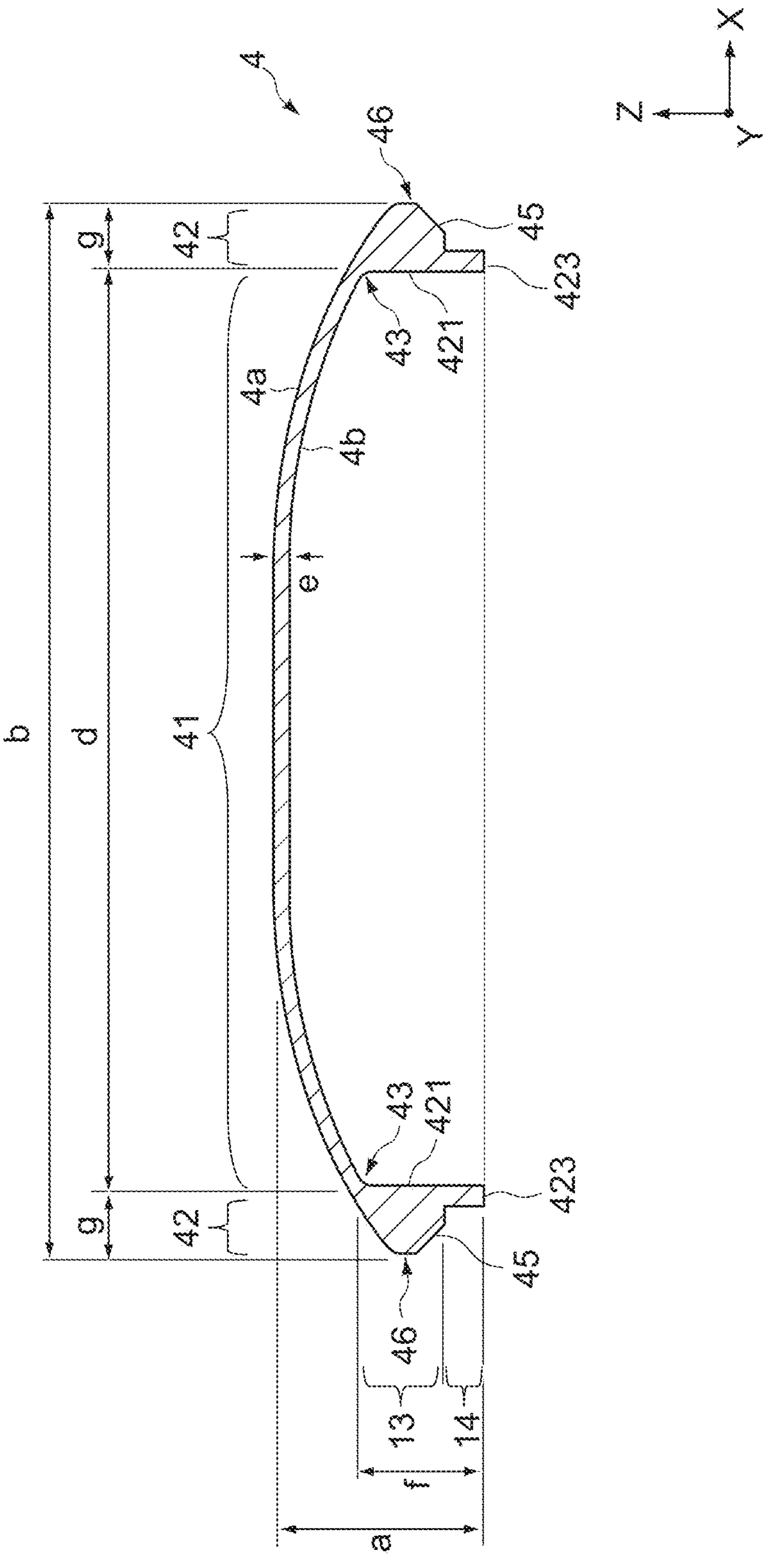
FIG. 8 is a cross-sectional view of a tactile sense providing layer that is a portion of the tactile sense providing module.

FIG. 8 is a cross-sectional view of the tactile sense providing layer 4. The tactile sense providing layer 4 is indicated by downward-sloping lines in each of FIGS. 6B, 8, 9A, and 9B.

As illustrated in FIGS. 6A and 7, the tactile sense providing layer 4 is elliptic in the plan view.

As illustrated in FIGS. 6A, 6B, and 8, the tactile sense providing layer 4 has an appearance having a shape of a dome of which a center portion is slightly bulging in the height direction Z.

The tactile sense providing layer 4 includes a skin-side surface (an upper surface in FIG. 8) 4*a* and a non-skin-side surface (a lower surface in FIG. 8) 4*b*. The skin-side surface 4*a* is a surface that can be brought into direct contact with the skin of the user U. The non-skin-side surface 4*b* is a surface that is in contact with the space 7.

As illustrated in FIG. 8, the tactile sense providing layer 4 includes the tactile sense providing film 41 and a base-member-fixed portion 42.

The tactile sense providing film 41 is formed to be relatively thin, and the base-member-fixed portion 42 is formed to be thick.

The wall-formed base-member-fixed portion (hereinafter simply referred to as a "base-member-fixed portion" in some cases) 42 is situated to surround an entire circumference of the tactile sense providing film 41.

In the tactile sense providing module 3, the tactile sense providing film 41 is a region that is formed into a thin film and can be deformed in response to fluid flowing into and out of the space 7, and the tactile sense providing film 41 is a portion that contributes toward providing a tactile sense. In the present embodiment, the tactile sense providing film 41 is elliptic in the plan view, and the entirety of the tactile sense providing film 41 has a uniform thickness.

In the tactile sense providing module 3, the tactile sense providing layer 4 is provided to cover the base 51 and wall 52 included in the substantially planar base member 5.

Here, the "thickness of the tactile sense providing film" refers to a size of the tactile sense providing film 41 in a normal direction that is vertical to a tangent plane of a curve of the non-skin-side surface 4*b*. In the tactile sense providing module 3 according to the present embodiment, the skin-side surface 4*a* of the tactile sense providing film 41 is formed to have a center portion including a substantially planar surface that is substantially parallel to the X-Y plane, and a peripheral portion having a gentle curve with low curvature. The tactile-sense-provision direction of the tactile sense providing module 3 is substantially parallel to the height direction Z.

On the other hand, the base-member-fixed portion 42 is a portion that is not easily deformed in response to fluid flowing into and out of the space 7 and that does not contribute toward providing a tactile sense. The base-member-fixed portion 42 surrounds the entire circumference of the tactile sense providing film 41, and is provided along a peripheral edge of the tactile sense providing film 41 to be formed into a wall that protrudes toward the inner side in the height direction Z from the tactile sense providing film 41.

In the present embodiment, the base-member-fixed portion 42 has a greater thickness than the tactile sense providing film 41. The base-member-fixed portion 42 has a substantially elliptic appearance in the plan view.

The wall-formed base-member-fixed portion 42 includes an inner wall surface 421 and an outer wall surface 422. In the present embodiment, the inner wall surface 421 is a curved surface that is substantially parallel to the height direction Z, and is a surface that is substantially vertical to the inner region 510 of the base 51 of the base member 5.

Here, the "thickness of the base-member-fixed portion" corresponds to a size of the wall-formed base-member-fixed portion 42 in a normal direction that is vertical to a tangent plane of a curve of the wall-formed base-member-fixed portion 42. In the present embodiment, a direction of the thickness of the base-member-fixed portion 42 refers to a direction that is substantially vertical to the tactile-sense-provision direction.

The direction of the thickness of the base-member-fixed portion 42 approximately corresponds to a direction in which fluid in the space 7 is pressed against the base-member-fixed portion 42 upon expansion.

Referring to FIG. 8, in a region of a peripheral edge of the tactile sense providing layer 4, a boundary 43 of the base-member-fixed portion 42 and the tactile sense providing film 41 corresponds to a portion in which there is a great change in a normal direction of a tangent plane corresponding to the non-skin-side surface 4*b* of the tactile sense providing layer 4 when the region of the peripheral edge is viewed in a direction from the center to the peripheral edge of the tactile sense providing layer 4.

In other words, in the tactile sense providing module 3, the normal direction is substantially parallel to the height direction Z with respect to the tactile sense providing film 41, whereas the normal direction is substantially vertical to the height direction Z with respect to the base-member-fixed portion 42. It can be said that the boundary 43 is a portion in which there is a great change in the normal direction. A portion situated further inward than the portion in which there is a great change in the normal direction corresponds to the tactile sense providing film 41, and a portion situated further outward than the portion in which there is a great change in the normal direction corresponds to the base-member-fixed portion 42. Further, according to the present technology, the base-member-fixed portion 42 has a greater thickness than the tactile sense providing film 41.

Note that, when, for example, the tactile sense providing film has a waved shape that has concave and convex portions alternately, the tactile sense providing film also includes a portion in which there is a great change in the normal direction. In the region of the peripheral edge of the tactile sense providing layer, a portion in which there is a great change in the normal direction when the region of the peripheral edge of the tactile sense providing layer is viewed in a direction from the center to the peripheral edge of the tactile sense providing layer, corresponds to the boundary of the base-member-fixed portion and the tactile sense providing film.

In the tactile sense providing module 3, the space 7 is formed by being surrounded by a portion of the inner wall surface 421, the non-skin-side surface 41*b* of the tactile sense providing film 41, the skin-side surface of the inner region 510 of the base member 5, the inner wall surface 521 of the wall 52, and the upper surface 54 of the wall 52, as illustrated in FIG. 6B as well as FIGS. 9A and 9B.

In the tactile sense providing module 3, the upper surface 54 of the wall 52 of the base member 5 is situated lower in the height direction Z in the figures (on the inner side in the height direction Z) than the boundary 43 of the tactile sense providing film 41 and the base-member-fixed portion 42 of the tactile sense providing layer 4. In other words, the inner wall surface 421 of the base-member-fixed portion 42 of the tactile sense providing layer 4 includes a region that is in contact with the base member 5, and a region that is not in contact with the base member 5 but in contact with the space 7. More particularly, a portion of the inner wall surface 421 that corresponds to a relatively thin second region 14 of the base-member-fixed portion 42 and a portion of a first region 13 (a lower portion of the first region 13 in the figure) of the base-member-fixed portion 42 that is continuous with the second region 14 is in contact with the outer wall surface 522 of the wall 52 of the base member 5. Accordingly, the base member 5 and the tactile sense providing layer 4 are bonded to be joined to each other. Further, a portion of the inner wall surface 421 that corresponds to another portion of the first region 13 (an upper portion of the first region 13 in the figure) of the base-member-fixed portion 42 is not in contact with the base member 5, and partially forms the space 7. The portion being included in the base-member-fixed portion 42 and contributing toward forming the space 7 is provided with a protrusion 46 described later, and is thick.

As illustrated in FIGS. 9A and 9B, the base-member-fixed portion 42 includes the relatively thick first region 13 and the relatively thin second region 14.

The first region 13 in the base-member-fixed portion 42 is included in the protrusion 46 protruding outward in the direction vertical to the height direction Z.

In the present embodiment, the base-member-fixed portion 42 has a nonuniform thickness in the height direction Z. In the tactile sense providing module 3, the portion being included in the base-member-fixed portion 42 and contributing toward forming the space 7 (the portion in contact with the space 7) is thicker than the tactile sense providing film 41. Note that the base-member-fixed portion 42 may have a uniform thickness in the height direction Z.

As described later, it is favorable that the base-member-fixed portion 42 include the protrusion 46 and have a wedge-shaped cross section, as in the case of the present embodiment, in order to determine the positions of the housing 2 and the tactile sense providing module 3 and to prevent the tactile sense providing module 3 in use from excessively sinking.

The tactile sense providing layer 4 is formed by the tactile sense providing film 41 and the base-member-fixed portion 42 being molded integrally with each other to be continuous with each other. The integral molding refers to forming using compression molding, a molding process, modeling using a 3D printer, or an integral molding process such as injection molding. When the tactile sense providing layer 4 is formed by integral molding, this makes it possible to enhance hermetic sealing of the tactile sense providing module 3, and thus to more stably provide a tactile sense promptly.

The tactile sense providing layer 4 may be made of one type of material or multiple types of materials. For example, when the tactile sense providing film is made of two types of materials, half a region of the tactile sense providing film is made of one of the two types of materials, and another half of the region is made of another of the two types of materials. This makes it possible to form the tactile sense providing film such that the tactile sense providing film exhibits different textures and different extents of expansion in a plane and provides more various kinds of tactile senses.

Further, the tactile sense providing film may include a plurality of regions of different degrees of stiffness. This makes it possible to provide more various kinds of tactile senses. The configuration in which the plurality of regions of different degrees of stiffness is included can be provided using different types of materials of different degrees of stiffness or by causing one type of material to include portions of different thicknesses to provide different degrees of stiffness.

(Deformation Rates of Tactile Sense Providing Film and Base-Member-Fixed Portion)

In the tactile sense providing module 3, the base-member-fixed portion 42 exhibits a lower rate of deformation caused between before and after fluid flows into the space 7 than the tactile sense providing film 41.

In calculation of a rate of deformation of the tactile sense providing film 41, the rate of deformation of the tactile sense providing film 41 is defined as a rate of deformation for a size (a) (refer to FIG. 8) of the tactile sense providing layer 4 in the height direction Z, the rate of deformation of the tactile sense providing film 41 being a rate of deformation of the tactile sense providing film 41 that is caused between before and after inflow of fluid. The calculation of the rate of deformation of the tactile sense providing film 41 will be described later. The size (a) of the tactile sense providing layer 4 in the height direction Z refers to a distance between an end portion (a lower portion in the figure) of the tactile sense providing layer 4 on the inner side in the height direction Z and an end portion (an upper portion in the figure) of the tactile sense providing layer 4 on the outer side in the height direction Z.

When the rate of deformation of the tactile sense providing film 41 and the rate of deformation of the base-member-fixed portion 42 are compared, a rate of deformation of a portion of the base-member-fixed portion 42 that contributes toward forming the space 7 and is thickest in the base-member-fixed portion 42, is referred to as the rate of deformation of the base-member-fixed portion 42.

In calculation of a rate of deformation of the base-member-fixed portion 42, the rate of deformation of the base-member-fixed portion 42 is defined as a rate of deformation for a size of the entirety of the tactile sense providing layer 4 in the direction of the thickness of the base-member-fixed portion 42, the rate of deformation of the base-member-fixed portion 42 being a rate of deformation of the base-member-fixed portion 42 that is caused between before and after inflow of fluid. The calculation of the rate of deformation of the base-member-fixed portion 42 will be described later. A rate of deformation for a size (b) (refer to FIG. 8) of a major axis of the base-member-fixed portion 42 elliptic in the plan view is obtained as the rate of deformation for the size of the entirety of the tactile sense providing layer 4 in the direction of the thickness of the base-member-fixed portion 42. Note that the base-member-fixed portion 42 forms an external form of the region of the peripheral edge of the tactile sense providing layer 4, and the major axis of the base-member-fixed portion 42 is equally sized to a major axis of the tactile sense providing layer 4.

A method for calculating a rate of deformation of the tactile sense providing film 41 and a rate of deformation of the base-member-fixed portion 42 is described below, the deformation of the tactile sense providing film 41 and deformation of the base-member-fixed portion 42 being caused between before and after inflow of fluid. An example in which the rate of deformation for the size (a) of the tactile sense providing layer 4 in the height direction Z is calculated as the rate of deformation of the tactile sense providing film 41, and the rate of deformation for the size (b) of the base-member-fixed portion 42 in a major-axis direction in which the major axis of the tactile sense providing layer 4 extends is calculated as the rate of deformation of the base-member-fixed portion 42, is described.

A rate of deformation of the tactile sense providing layer 4 that is caused between before and after fluid flows into the space 7 is calculated on the basis of a change in the size (a) of the tactile sense providing layer 4 in the height direction Z that is caused between before and after inflow of fluid, and on the basis of a change in the size (b) of the major axis of the tactile sense providing layer 4 that is caused before and after inflow of fluid, the changes being caused when fluid flows into the space 7 until a pressure in the space 7 reaches 10 kPa, where the pressure in the space 7 before fluid flows into the space 7 is 1 kPa. A pressure sensor that is arranged in the space 7 can be used to measure the pressure in the space 7. A size of the tactile sense providing layer 4 before inflow of fluid and a size of the tactile sense providing layer 4 after the inflow of fluid can each be obtained on the basis of an image of the tactile sense providing module 3 that is captured from the side, as illustrated in FIG. 6B.

In the tactile sense providing module 3 of the tactile sense providing apparatus 1 according to the present embodiment, the rate of deformation of the tactile sense providing film 41 can be calculated using (a')/(a), where, referring to FIG. 8, (a) represents the size of the tactile sense providing layer 4 in the height direction Z before inflow of fluid, and (a') represents the size of the tactile sense providing layer 4 in the height direction Z after the inflow of fluid.

Further, the rate of deformation of the base-member-fixed portion 42 can be calculated using (b')/(b), where (b) represents the size of the major axis of the tactile sense providing layer 4 before the inflow of fluid, and (b') represents the size of the major axis of the tactile sense providing layer 4 after the inflow of fluid.

According to the present technology, in the tactile sense providing module 3 of the tactile sense providing apparatus 1, the rate of deformation ((b')/(b), (c')/(c)) in the major-axis direction is lower than the rate of deformation ((a')/(a)) of the tactile sense providing layer 4 in the height direction Z.

Note that the rate of deformation for the size (b) of the major axis of the base-member-fixed portion 42 has been described here as an example of a deformation-rate-comparison target for convenience. However, according to the present technology, the rate of deformation for the size of the entirety of the tactile sense providing layer 4 in the direction of the thickness of the base-member-fixed portion 42 is lower than the rate of deformation of the tactile sense providing film 41 in the entirety of the base-member-fixed portion 42.

In other words, the tactile sense providing layer 4 of the tactile sense providing module 3 easily stretches in the height direction Z corresponding to the tactile-sense-provision direction, and does not easily expand or shrink or does not expand or shrink in a direction other than the tactile-sense-provision direction.

The rate of deformation of the tactile sense providing film 41 in the tactile-sense-provision direction exhibits a numerical value larger than 1.0, the deformation being caused between before and after inflow of fluid. A threshold of a sense of touch pressure differs depending on a body part that is a tactile-sense-provision target. Thus, the rate of deformation of the tactile sense providing film 41 in the tactile-sense-provision direction can be set as appropriate according to the tactile-sense-provision-target body part.

It is favorable that the rate of deformation for the size of the entirety of the tactile sense providing layer 4 in the direction of the thickness of the base-member-fixed portion 42 (the rate of deformation of the base-member-fixed portion) be 1.0, that is, the entirety of the tactile sense providing layer 4 not be deformed in the direction of the thickness of the base-member-fixed portion 42 in response to inflow or outflow of fluid, in order to efficiently provide a tactile sense in the tactile-sense-provision direction.

In the present embodiment, the base-member-fixed portion 42 is thicker than the tactile sense providing film 41. This results in the base-member-fixed portion exhibiting a lower rate of deformation caused between before and after inflow of fluid than the tactile sense providing film.

In the present embodiment, the thickness of the base-member-fixed portion 42 (the size of the base-member-fixed portion 42 in the direction vertical to the height direction Z) is greater than the thickness of the tactile sense providing film 41 in the tactile sense providing layer 4. Further, the base-member-fixed portion 42 is provided to be formed into a wall that protrudes toward the inner side in the height direction Z from the tactile sense providing film 41. Thus, the size of the base-member-fixed portion 42 in the height direction Z is greater than the thickness of the tactile sense providing layer 4 (the size of the tactile sense providing layer 4 in the height direction Z).

In the tactile sense providing layer 4, the tactile sense providing film 41 is relatively thin, and the wall-formed base-member-fixed portion 42 is thick, as described above.

Such a configuration makes it possible to cause the base-member-fixed portion 42 to exhibit a lower rate of deformation caused between before and after inflow/outflow of fluid than the tactile sense providing film 41. Consequently, in the tactile sense providing module 3, the tactile sense providing film 41 expands or shrinks in the tactile-sense-provision direction (the height direction Z in the present embodiment) in response to inflow or outflow of fluid, whereas the base-member-fixed portion 42 does not expand or shrink in response to inflow or outflow of fluid.

In other words, upon inflow of fluid, a force of fluid is applied to the base-member-fixed portion 42 in a direction different from the tactile-sense-provision direction provided to the user U (such as the direction substantially vertical to the tactile-sense-provision direction). When the base-member-fixed portion 42 is made thick, this results in preventing the base-member-fixed portion 42 from expanding. Accordingly, expansion of the tactile sense providing layer 4 in a direction other than a desired tactile-sense-provision direction is prevented.

In the tactile sense providing module 3 of the tactile sense providing apparatus 1, a rate of volume variation in the space 7 due to fluid flowing into and out of the space 7 can be reduced, and a tactile sense can be provided promptly by increasing a speed of expansion and shrinkage of the tactile sense providing layer 4. In addition, a power loss in the actuator that is caused due to expansion and shrinkage in a direction other than a desired tactile-sense-provision direction can also be prevented. This makes it possible to reduce power consumption.

Here, a tactile sense providing module 103 according to a comparative example is described with reference to FIG. 18.

The tactile sense providing module 103 according to the comparative example includes a base member 105 and a tactile sense providing layer 104 that is formed using an elastic body. The tactile sense providing module 103 is configured such that fluid flows into and out of a space 107 that is formed by the base member 105 and the tactile sense providing layer 104. When fluid flows into and out of the space 107, the tactile sense providing layer 104 is deformed in response to a volume variation in the space 107, and a tactile sense is provided to a user.

In the tactile sense providing module 103, the entirety of the tactile sense providing layer 104 is a thin film that has a uniform thickness. The tactile sense providing layer 104 includes a tactile sense providing film 141 and a base-member-fixed portion 142. The base-member-fixed portion 142 is situated to surround an entire circumference of the tactile sense providing film 141. The base-member-fixed portion 142 is bonded to be fixed to the base member 105.

Figure 18:
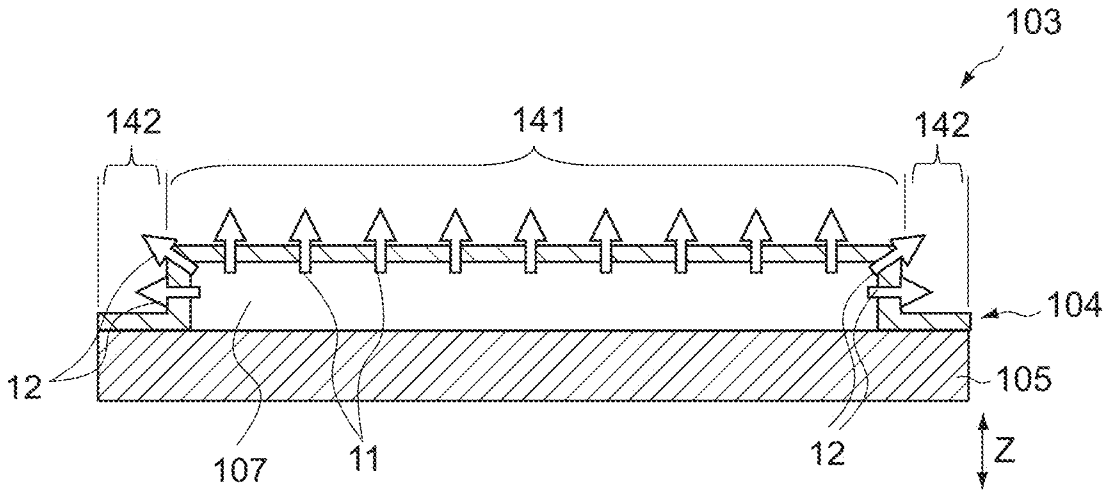
FIG. 18 is a schematic cross-sectional view of a tactile sense providing module according to a comparative example.

In the tactile sense providing module 103, the tactile sense providing layer 104 is formed to have a uniform thickness, as illustrated in FIG. 18. Thus, when the tactile sense providing film 141 of the tactile sense providing layer 104 expands in response to inflow of fluid to provide a tactile sense in the height direction Z, the tactile sense providing layer 104 also stretches in a region of a peripheral edge of the tactile sense providing film 141 in a direction 12 that is different from a tactile-sense-provision direction 11. Thus, there is an increase in a rate of volume variation in the space 107, and a speed of expansion and shrinkage due to fluid is reduced. This results in easily causing a power loss in an actuator due to expansion and shrinkage in a direction that is different from the tactile-sense-provision direction, and in difficulty in providing a tactile sense promptly.

On the other hand, in the tactile sense providing layer 4 of the tactile sense providing module 3 according to the present embodiment, the base-member-fixed portion 42 exhibits a lower rate of deformation caused between before and after fluid flows into the space 7 than the tactile sense providing film 41. This makes it possible to increase a speed at which the tactile sense providing layer 4 expands and shrinks, and thus to provide a tactile sense promptly. This also makes it possible to prevent a power loss in the actuator from being caused due to expansion and shrinkage in a direction other than a desired tactile-sense-provision direction.

(How Base Member and Tactile Sense Providing Layer are Fixed to Each Other)

As illustrated in FIG. 6B as well as FIGS. 9A and 9B, the tactile sense providing layer 4 is arranged to cover the wall 52 of the base member 5, and the tactile sense providing layer 4 and the base member 5 are bonded to be fixed to each other.

More particularly, the outer wall surface 522 of the wall of the base member 5 and the inner wall surface 421 of the base-member-fixed portion 42 of the tactile sense providing layer 4 are in contact with each other, and the frame region 511 of the base 51 of the base member 5 and a bottom surface 423 of the base-member-fixed portion 42 are in contact with each other. Then, the base member 5 and the tactile sense providing layer 4 are bonded to be fixed to each other using an adhesive (not illustrated) that is applied to respective surfaces (contact surfaces) that are in contact with each other.

In FIGS. 9A and 9B, a portion (contact surfaces) in which the base member 5 and the tactile sense providing layer 4 are in contact with each other is indicated by being surrounded by a dashed ellipse 56. Note that the adhesive may be applied to the entirety of the contact surfaces on which the base member 5 and the tactile sense providing layer 4 are in contact with each other, or may be partially applied to the contact surfaces. When an adhesive is partially applied to contact surfaces, a continuous application pattern such as a spiral or zigzag pattern in which an applied portion with the adhesive and a non-applied portion without the adhesive are situated alternately, may be used as a pattern of applying an adhesive. Further, an application pattern in which multiple adhesives are discontinuously intermittently arranged circumferentially on contact surfaces may be used.

In the present embodiment, the contact surfaces on which the outer wall surface 522 of the wall 52 of the base member 5 and the inner wall surface 421 of the base-member-fixed portion 42 of the tactile sense providing layer 4 are in contact with each other are surfaces that is parallel to the tactile-sense-provision direction (the height direction Z), as illustrated in FIGS. 9A and 9B.

Such a configuration makes it possible to make a range of the tactile sense providing film 41 larger in proportion to a size of the entirety of the tactile sense providing module 3.

Here, when the bonding surfaces of bonding of the tactile sense providing layer 104 and the base member 105 are parallel to a direction vertical to the height direction Z corresponding to a tactile-sense-provision direction, as in the case of the tactile sense providing module 103 according to the comparative example illustrated in FIG. 18, there is a need to make the area of bonding of the tactile sense providing layer 104 and the base member 105 larger in order to improve the strength of bonding of the tactile sense providing layer 104 and the base member 105 and to enhance hermetic sealing of the tactile sense providing module 103. The bonding surfaces of bonding of the tactile sense providing layer 104 and the base member 105 correspond to a region that is parallel to a surface vertical to the tactile-sense-provision direction and that does not contribute toward providing a tactile sense. Thus, a range (of the tactile sense providing film 141) to which a tactile sense can be provided is made smaller in proportion to the size of the entirety of the tactile sense providing module 103.

On the other hand, in the tactile sense providing module 3 of the tactile sense providing apparatus 1 according to the present embodiment, the base member 5 and the inner wall surface 421 of the wall-formed base-member-fixed portion 42 of the tactile sense providing layer 4 are in contact to be fixed to each other, and the contact surfaces of the base member and the tactile sense providing layer 4 are substantially parallel to a tactile-sense-provision direction (the height direction Z). Consequently, the tactile sense providing module 3 according to the present embodiment makes it possible to make a range of the tactile sense providing film 41 larger in proportion to the size of the entirety of the tactile sense providing module 3, and thus an effective area in which a tactile sense can be provided can be made larger. In other words, a degree of freedom in a design of the tactile sense providing apparatus 1 can be increased.

Further, in the tactile sense providing module 3, the frame region 511 of the base 51 of the base member 5 and the bottom surface 423 of the base-member-fixed portion 42 are in contact with each other on their contact surfaces substantially vertical to the height direction Z, in addition to the outer wall surface 522 and the inner wall surface 421 being in contact with each other on their contact surfaces substantially parallel to the height direction Z.

As described above, the base member 5 and the tactile sense providing layer 4 are bonded to be fixed to each other on pairs of contact surfaces, where the pairs of contact surfaces are respectively parallel to different directions. This makes it possible to improve the strength of bonding of the base member 5 and the tactile sense providing layer 4.

Further, as described above, a plurality of wall holes 55 intermittently arranged along the outer periphery of the wall 52 is provided to a portion around a boundary of the wall 52 and the frame region 511 of the base 51 in the base member 5, as illustrated in FIGS. 7 and 9A. In other words, holes are intermittently situated in a contact region in which the outer wall surface 522 of the wall 52 of the base member 5 and the inner wall surface 421 of the base-member-fixed portion 42 of the tactile sense providing layer 4 are in contact with each other. Here, the "contact region" in which the base member and the tactile sense providing layer are in contact with each other includes contact surfaces on which the base member and the tactile sense providing layer are in contact with each other, and contactless surfaces on which the base member and the tactile sense providing layer are not in contact with each other due to holes being provided to the base member.

Referring to FIG. 9A, an adhesive is applied to the inside of the hole 55 from the side of a non-skin-side surface of the base member 5 (a lower side of the base member 5 in FIG. 9A) in the present embodiment.

As described above, an adhesive is applied to the hole 55 provided to a bonding region in which the base member 5 is bonded to the tactile sense providing layer 4, and this results in providing anchor effects. This makes it possible to ensure bonding of the base member 5 and the tactile sense providing layer 4 more certainly, and thus to enhance hermetic sealing of the tactile sense providing module 3.

(Positional Relationship Between Base Member and Tactile Sense Providing Layer in Tactile Sense Providing Module)

It is favorable that, in the tactile sense providing module 3, the upper surface 54 of the wall 52 of the base member 5 be situated lower in the height direction Z in FIG. 6B as well as FIGS. 9A and 9B (on the inner side in the height direction Z) than the boundary 43 of the tactile sense providing film 41 and the base-member-fixed portion 42 in the tactile sense providing layer 4, as illustrated in the figures. In other words, it is favorable that, in the tactile sense providing module 3, the inner wall surface 421 of the base-member-fixed portion 42 of the tactile sense providing layer 4 include a region that is in contact with the base member 5, and a region that is not in contact with the base member 5 but in contact with the space 7.

Such a configuration makes it possible to make a distance between the rigid base member 5 and a tactile-sense-provision-target body part of the user U larger when the tactile sense providing apparatus 1 provides a tactile sense to the user U. This results in not easily indicating a texture of the base member 5 to the user U, and thus in being able to satisfactorily provide a tactile sense without bringing an uncomfortable feeling.

Further, the tactile sense providing film 41 is less rigid than the thick base-member-fixed portion 42 in the tactile sense providing layer 4 since the tactile sense providing film 41 is relatively thin. Consequently, upon expansion of the tactile sense providing layer 4, stress is more easily caused at the boundary 43 of the tactile sense providing film 41 and base-member-fixed portion 42 exhibiting different degrees of rigidity. In the present embodiment, the base member 5 is situated on the inner side in the height direction Z, as viewed from the boundary 43 of the tactile sense providing film 41 and the base-member-fixed portion 42. This makes it possible to prevent the base member 5 from being easily brought into contact with the boundary 43. This makes it possible to prevent, upon expansion of the tactile sense providing layer 4, the base member 5 from being brought into contact with the boundary 43 at which stress is easily caused, and to prevent the tactile sense providing layer 4 from being easily degraded over time.

(Regarding Protrusion of Wall-Formed Base-Member-Fixed Portion)

As described above, the wall-formed base-member-fixed portion 42 includes the protrusion 46 protruding in the direction of the thickness of the wall-formed base-member-fixed portion 42 (in a direction vertical to the height direction Z). The protrusion 46 is used to determine the positions of the housing 2 and the tactile sense providing module 3. Further, the protrusion 46 also serves as a stopper that prevents the tactile sense providing module 3 from excessively sinking into the housing 2 toward the inner side in the height direction Z when an external force applied toward the inner side in the height direction Z is applied to the tactile sense providing apparatus 1 by a user grasping the tactile sense providing apparatus 1 in use. A relationship between the protrusion 46 and the housing 2 will be described in a second embodiment.

(Examples of Sizes of Respective Structural Elements)

For example, the size and the shape of the tactile sense providing module 3, as well as the size, the shape, and the thickness of the tactile sense providing layer used in the tactile sense providing module can be set as appropriate according to the application of the tactile sense providing apparatus or according to a tactile-sense-provision-target body part. Specific numerical values are described below, although the numerical values are not limited thereto.

As an example, the tactile sense providing apparatus 1 according to the present embodiment that is used by being held with a hand is formed into a substantial ellipse in the plan view, where the substantial ellipse has a major axis of 64 mm and a minor axis of 34 mm.

Referring to FIG. 8, examples of sizes related to the tactile sense providing module 3 of the tactile sense providing apparatus 1 according to the present embodiment are described.

The tactile sense providing layer 4 used in the tactile sense providing module 3 has a shape of a substantial ellipse in the plan view, where the substantial ellipse has a major axis having the size (b) of 53 mm, and a minor axis having a size of 37 mm. The tactile sense providing layer 4 has the size (a) of 10.7 mm in the height direction Z.

The tactile sense providing film 41 of the tactile sense providing layer 4 has a shape of a substantial ellipse in the plan view, where the substantial ellipse has a major axis having a size (d) of 46 mm, and a minor axis having a size of 30 mm. The tactile sense providing film 41 has a thickness of a size (e) of 0.8 mm.

The base-member-fixed portion 42 of the tactile sense providing layer 4 has a size (f) of 5.5 mm in the height direction, and has a maximum thickness of a size (g) of 3.5 mm.

[Example of Applying Tactile Sense Providing Apparatus]

The tactile sense providing apparatus 1 according to the present embodiment is sized to be holdable by the user U with his/her single hand, as illustrated in FIG. 4.

The tactile sense providing apparatus 1 can provide a sense-of-pressure stimulus to the hand of the user U using two tactile sense providing modules 3. One of the tactile sense providing modules 3 is provided to a position that corresponds to fingers of the user U when the user grasps the tactile sense providing apparatus 1, and is provided to, for example, a position that corresponds to a portion near first joints of four fingers that are an index finger, a middle finger, a third finger, and a little finger. Another of the tactile sense providing modules 3 is provided to a position that corresponds to the palm of the hand of the user U when the user grasps the tactile sense providing apparatus 1.

Further, in the present embodiment, the tactile sense providing apparatus 1 includes, as a detector, the pressure sensor 8 detecting a force of the user U, as illustrated in FIG. 2. For example, the pressure sensor 8 is provided to a position that corresponds to the fingers of the user U when the user grasps the tactile sense providing apparatus 1, and is provided to a position that corresponds to a portion near third joints of two fingers that are the index finger and the middle finger.

A specific example of applying the tactile sense providing apparatus 1 is described.

Figure 5A:
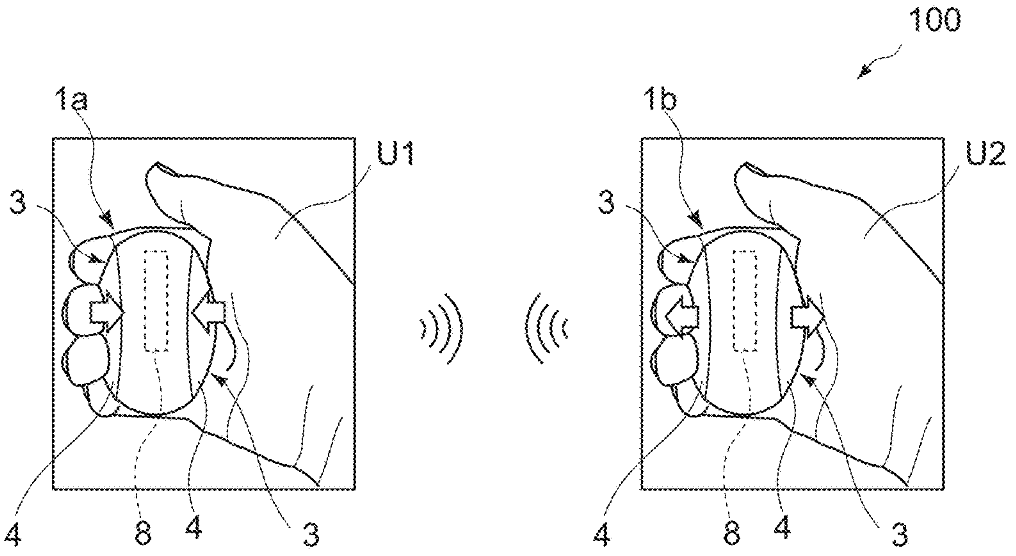
FIGS. 5A and 5B are diagrams used to describe examples of using the tactile sense providing apparatus.

For example, users situated distant from each other can communicate with each other using a tactile sense by use of the tactile sense providing apparatuses 1. FIG. 5A is a diagram used to describe a tactile sense providing system 100 that enables two users to communicate with each other using a tactile sense even when the two users are situated distant from each other.

Figure 5B:
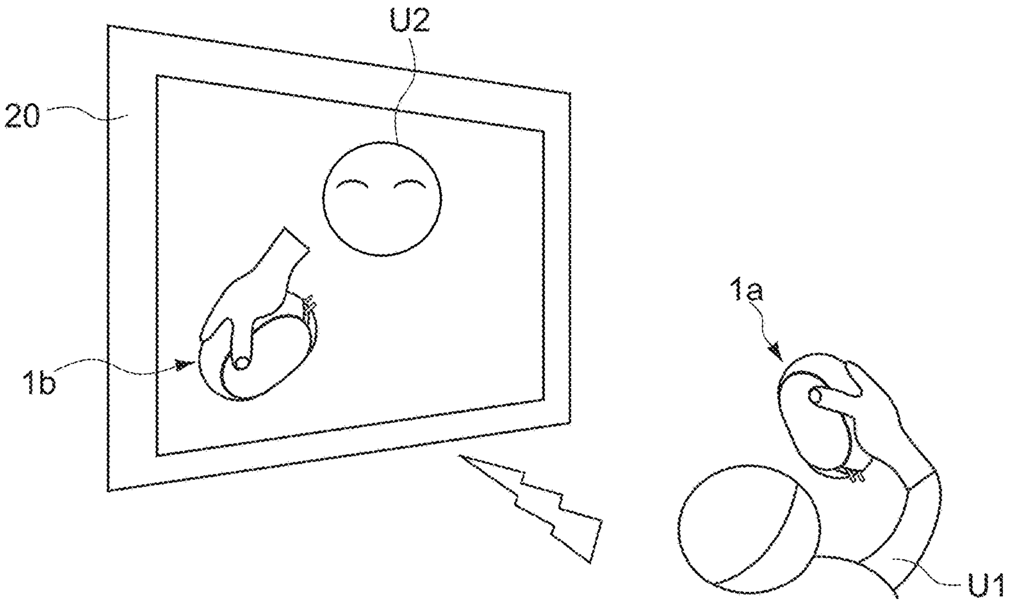

FIG. 5B illustrates the two users communicating with each other using a tactile sense by use of the tactile sense providing apparatuses 1.

Here, one of the two tactile sense providing apparatuses 1 is referred to as a first tactile sense providing apparatus 1*a*, and another of the two tactile sense providing apparatuses 1 is referred to as a second tactile sense providing apparatus 1*b*, in order to particularly distinguish the two tactile sense providing apparatuses 1. Further, the user operating the first tactile sense providing apparatus 1*a* is referred to as a first user U1, and the user operating the second tactile sense providing apparatus 1*b* is referred to as a second user U2, in order to distinguish the two users.

Further, terms starting with "first" and "second" are respectively used for the first tactile sense providing apparatus 1*a* and the second tactile sense providing apparatus 1*b* in order to distinguish, for example, respective structural elements having similar configurations.

As illustrated in FIG. 5B, the first user U1 and the second user U2 can communicate with each other using a tactile sense by use of the respectively held first tactile sense providing apparatus 1*a* and second tactile sense providing apparatus 1*b*, while viewing a display 20 on which their counterparts can be seen.

Note that an example in which two tactile sense providing apparatuses 1 are used, is described here. However, the number of tactile sense providing apparatuses 1 may be at least three. Likewise, the number of users is not limited to two, and may be at least three. Further, some of the users may be fictional characters (such as a character of an animated cartoon and a virtual idol who are displayed on a screen).

(When First User U1 Grasps First Tactile Sense Providing Apparatus 1*a*)

When the first user U1 holds the first tactile sense providing apparatus 1*a* and grasps the first tactile sense providing apparatus 1*a*, as illustrated in FIGS. 5A and 5B, a first pressure sensor 8 detects a first pressure value dependent on a grasping force of the first user U1. A first controller 15 directly transmits the detected first pressure value to the second tactile sense providing apparatus 1*b*, or indirectly transmits the detected first pressure value to the second tactile sense providing apparatus 1*b* through, for example, a server apparatus.

A second controller 15 of the second tactile sense providing apparatus 1*b* receives, from the first tactile sense providing apparatus 1*a*, the first pressure value directly or indirectly through, for example, the server apparatus.

The second controller 15 drives a second actuator 9 according to the first pressure value to control flows of fluid into and out of a second space 7. This enables the second controller 15 to provide the second user U2 with a sense of pressure dependent on the first pressure value by expanding and shrinking the tactile sense providing layer 4 of a second tactile sense providing module 3. This enables the second tactile sense providing apparatus 1*b* to cause the second user U2 to feel as if the palm of his/her hand is being pressed due to expansion of the tactile sense providing layer. Further, this enables the second tactile sense providing apparatus 1*b* to cause the second user U2 to feel as if the pressed palm of his/her hand returns to its original state due to shrinkage of the tactile sense providing layer.

This enables the second tactile sense providing apparatus 1*b* to cause the second user U2 to feel as if the hand of the second user U2 is held by the first user U1.

(When Second User U2 Grasps Second Tactile Sense Providing Apparatus 1*b*)

When the second user U2 holds the second tactile sense providing apparatus 1*b* and grasps the second tactile sense providing apparatus 1*b*, a second pressure sensor 8 detects a second pressure value dependent on a grasping force of the second user U2. The second controller 15 directly transmits the detected second pressure value to the first tactile sense providing apparatus 1*a*, or indirectly transmits the detected second pressure value to the first tactile sense providing apparatus 1*a* through, for example, a server apparatus.

The first controller 15 of the first tactile sense providing apparatus 1*a* receives, from the second tactile sense providing apparatus 1*b*, the second pressure value directly or indirectly through, for example, the server apparatus.

The first controller 15 drives a first actuator 9 according to the second pressure value to control flows of fluid into and out of a first space 7. This enables the first controller 15 to provide the first user U1 with a sense of pressure dependent on the second pressure value by expanding and shrinking the tactile sense providing layer 4 of a first tactile sense providing module 3. This enables the first tactile sense providing apparatus 1*a* to cause the first user U1 to feel as if the palm of his/her hand is being pressed due to expansion of the tactile sense providing layer. Further, this enables the first tactile sense providing apparatus 1*a* to cause the first user U1 to feel as if the pressed palm of his/her hand returns to its original state due to shrinkage of the tactile sense providing layer.

This enables the first tactile sense providing apparatus 1*a* to cause the first user U1 to feel as if the hand of the first user U1 is held by the second user U2.

The tactile sense providing apparatus 1 may further include a temperature sensor as a detector and a thermoelectric conversion element as a provision section, the temperature sensor detecting a temperature of the skin of the hand of the user U. This makes it possible to provide not only a tactile sense using the tactile sense providing module 3 but also, for example, senses of warmth and coldness using the thermoelectric conversion element when communication is performed using a tactile sense by use of the tactile sense providing apparatus 1, as described above with reference to FIGS. 5A and 5B. This results in being able to provide more various tactile senses to the skin of the user U.

Typically, the thermoelectric conversion element is a Peltier element.

A sense of warmth or a sense of coldness can be provided to a user by a sense-of-warmth stimulus or a sense-of-coldness stimulus being provided to the user using heat generated due to heat being released or absorbed by the thermoelectric conversion element. The thermoelectric conversion element is provided to be situated in the space 7, and, for example, the thermoelectric conversion element can be provided by being bonded to the non-skin-side surface 4*b* (a surface in contact with the space) of the tactile sense providing layer of the tactile sense providing layer 4. Note that, when liquid is used as fluid, a waterproof processing treatment may be performed on the thermoelectric conversion element.

An example of using the tactile sense providing apparatus to which the temperature sensor and the thermoelectric conversion element have been further added is described.

For example, when two users communicate with each other using a tactile sense, the tactile sense providing apparatus held by one of the users detects not only a pressure value dependent on a grasping force caused when the one of the users grasps the tactile sense providing apparatus, but also a value of a temperature of the skin of the hand of the one of the users using the temperature sensor.

The detected pressure value and temperature value are transmitted to the tactile sense providing apparatus of another of the users.

The tactile sense providing apparatus of the other of the users drives its actuator on the basis of the received pressure value to control flows of fluid into and out of its space of its tactile sense providing module, and to control its thermoelectric conversion element for warmth and coolness on the basis of the received temperature value.

Consequently, a state in which the hand of the other of the users is held by the one of the users, is reproduced by the tactile sense providing apparatus of the other of the users. This enables the other of the users to feel as if the hand of the other of the users is held by the one of the users.

Further, the use of the temperature sensor makes it possible to perform control such that a temperature of the tactile sense providing layer that reaches due to heat being released and absorbed by the thermoelectric conversion element is in a desired range. For example, the temperature sensor can be used as a limiter to prevent the temperature of the tactile sense providing layer from exceeding 40° C. and prevent the tactile sense providing layer from becoming too hot in order to prevent a user from getting burned, or to prevent the temperature of the tactile sense providing layer from falling below 20° C. and prevent the tactile sense providing layer from becoming too cold. This makes it possible to enhance safety in use.

Note that, for example, the number of and positions of tactile sense providing modules in the tactile sense providing apparatus 1, and the number of and positions of detectors including a pressure sensor and a temperature sensor are not limited to the configurations described here, and can be set as appropriate according to the application of the tactile sense providing apparatus or according to a tactile-sense-provision-target body part.

Further, the number of tactile sense providing modules 3 can be adjusted according to the body part to which a tactile sense is to be provided, and may be at least one. Furthermore, in the present embodiment, the tactile sense providing apparatus 1 is configured such that two tactile sense providing modules 3 are situated to face each other and such that the tactile-sense-provision directions of the two tactile sense providing modules 3 are about 180 degrees from each other. However, the present technology is not limited thereto. The tactile sense providing apparatus 1 may be configured as appropriate such that the respective tactile-sense-provision directions of a plurality of tactile sense providing modules are identical to or different from each other depending on a body part to which a tactile sense is to be provided, or depending on the type of tactile sense desired to be provided.

Second Embodiment

Figure 10:
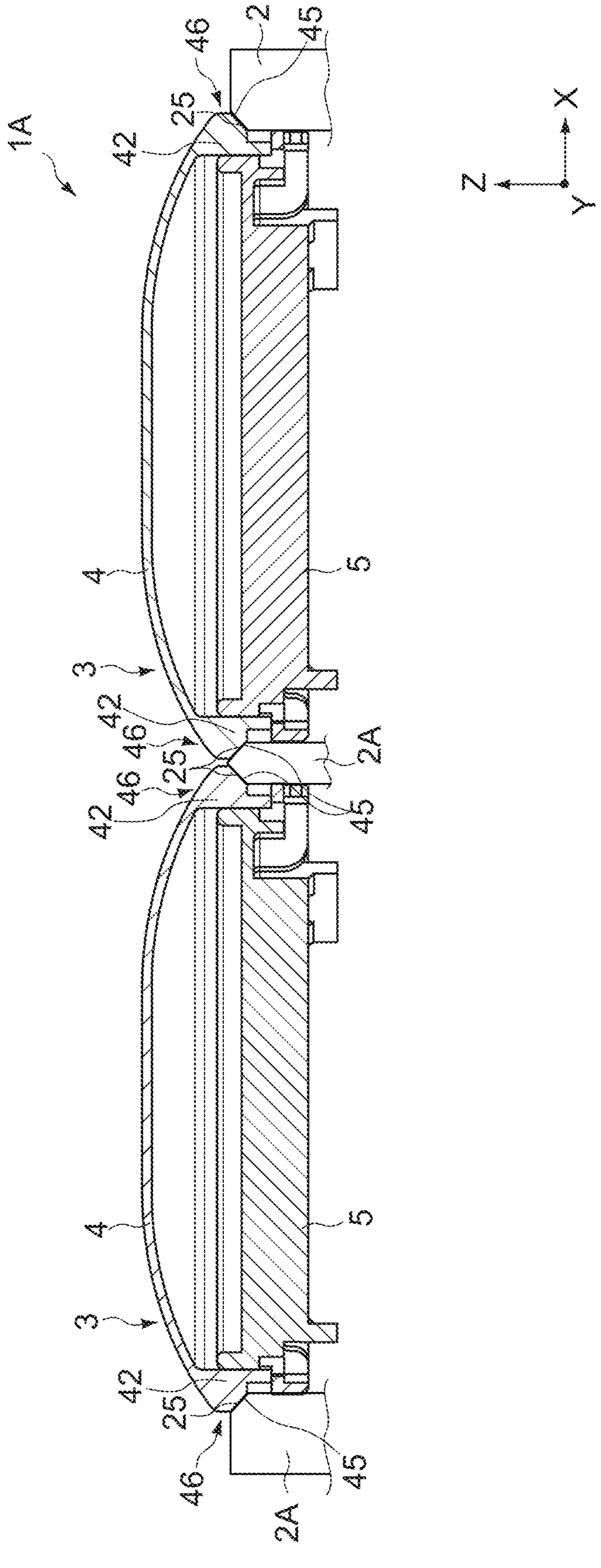
FIG. 10 is a schematic partial cross-sectional view of a tactile sense providing apparatus according to a second embodiment of the present technology.

A tactile sense providing apparatus 1A according to the second embodiment is described with reference to FIG. 10. FIG. 10 is a schematic cross-sectional view of the tactile sense providing apparatus 1A.

The example in which two tactile sense providing modules 3 are arranged to face each other and tactile-sense-provision directions of the two tactile sense providing modules 3 upon expansion are about 180 degrees from each other, has been described for the tactile sense providing apparatus 1 according to the first embodiment. However, the present technology is not limited thereto. For example, a plurality of tactile sense providing modules 3 may be arranged in a configuration in which the plurality of tactile sense providing modules 3 is included in the tactile sense providing apparatus 1A, such that tactile-sense-provision directions of the plurality of tactile sense providing modules 3 upon expansion are identical, as in the case of the tactile sense providing apparatus 1A illustrated in FIG. 10. The tactile sense providing module 3 included in the tactile sense providing apparatus 1A according to the second embodiment has a configuration similar to the configuration of the tactile sense providing module 3 described in the first embodiment.

As illustrated in FIG. 10, the tactile sense providing apparatus 1A according to the present embodiment includes two tactile sense providing modules 3, and a housing 2A that accommodates therein the tactile sense providing modules 3.

The tactile sense providing layer 4 of the tactile sense providing module 3 includes the protrusion 46 in the wall-formed base-member-fixed portion 42 situated on the peripheral edge of the tactile sense providing layer 4, the protrusion 46 protruding outward in the direction of the thickness of the wall-formed base-member-fixed portion 42 (in the direction vertical to the height direction Z). The wall-formed base-member-fixed portion 42 has a shape of a wedge that is made thinner toward the bottom surface 423 in the height direction Z (toward the inner side in the height direction Z). The protrusion 46 is used to determine positions of the housing 2A and the tactile sense providing module 3.

In FIGS. 8 and 10, the protrusion 46 includes an inclined surface 45 in which the wall-formed base-member-fixed portion 42 is made gradually thinner downward in the figures in the first region 13 of the protrusion 46. The inclined surface 45 is provided obliquely to the tactile-sense-provision direction. On the other hand, the housing 2A includes an inclined surface 25, and the positions of the tactile sense providing module 3 and the housing 2A are determined by the inclined surface 25 and the inclined surface 45 of the tactile sense providing layer 4 being brought into contact with each other when the housing 2A and the tactile sense providing module 3 are assembled to each other. Note that the same applies to the tactile sense providing apparatus 1 according to the first embodiment. In addition, the position of each of the plurality of tactile sense providing modules 3 is determined relative to the housing 2A in the tactile sense providing apparatus 1A according to the present embodiment. This also makes it possible to determine the positions of the two tactile sense providing modules 3 such that the two tactile sense providing modules 3 also have a desired positional relationship in the height direction Z.

Further, the protrusion 46 includes a surface (the inclined surface 45 according to the present embodiment) that is oriented toward a direction that is different from the tactile-sense-provision direction, and this prevents the tactile sense providing module 3 from excessively sinking into the housing 2A toward the inner side in the height direction Z when an external force applied toward the inner side in the height direction Z is applied to the tactile sense providing apparatus 1A. Note that the same applies to the tactile sense providing apparatus 1 according to the first embodiment.

<Modifications of Tactile Sense Providing Module>

Modifications of the tactile sense providing module are described.

In the modifications described below, the base-member-fixed portion exhibits a lower rate of deformation caused between before and after fluid flows into and out of the space than the tactile sense providing film, as in the case of the tactile sense providing module described in the embodiments above. This makes it possible to efficiently provide a tactile sense in the tactile-sense-provision direction.

In the embodiments above, the plane shape of the tactile sense providing layer providing a tactile sense to a skin of a user is substantially elliptic (a shape in the plan view). However, the shape of the tactile sense providing layer is not limited thereto, and the tactile sense providing layer may have any shape such as a perfectly circular shape or a polygonal shape. The plane shape of the tactile sense providing layer can be set as appropriate according to the application of the tactile sense providing apparatus or according to a tactile-sense-provision-target body part.

Figure 11A:
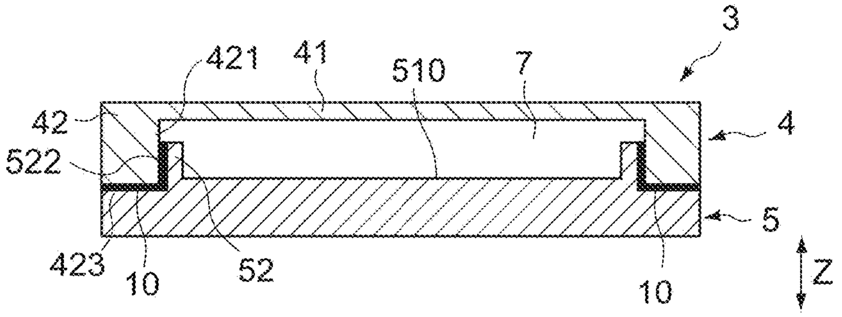
FIGS. 11A, 11B, 11C, and 11D are set of schematic cross-sectional views of tactile sense providing modules according to modifications, and is a diagram used to describe positions of contact surfaces of the tactile sense providing layer and base member included in the tactile sense providing module.

FIG. 11A is a schematic cross-sectional view of the tactile sense providing module 3 according to the embodiments described above.

Figure 11B:
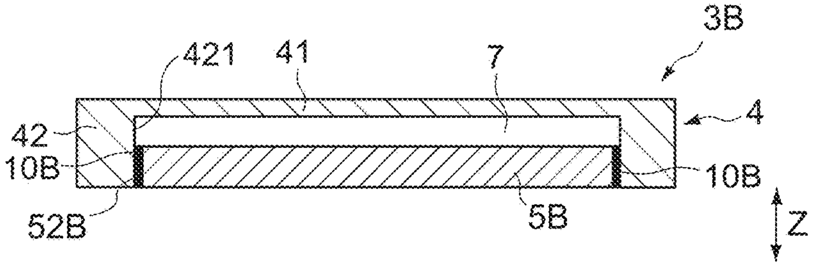
Figure 11C:
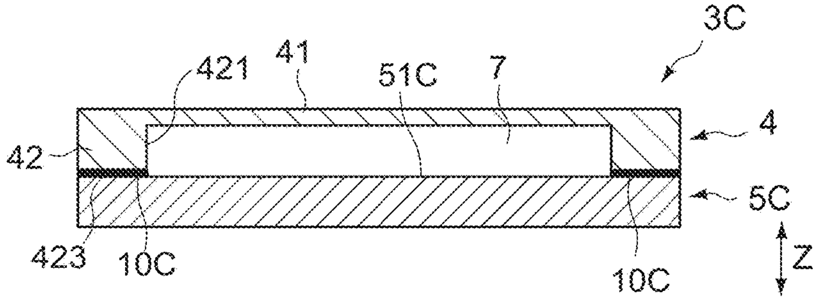
Figure 11D:
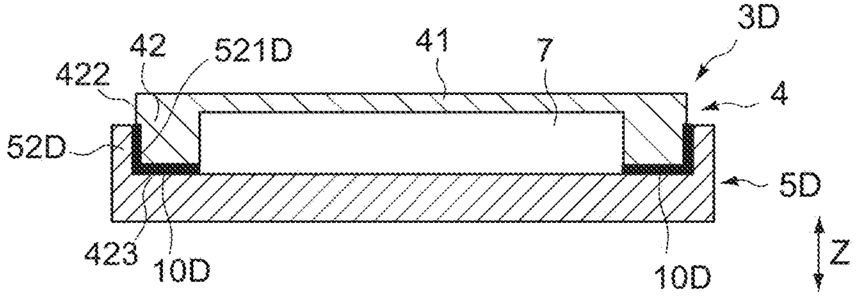

FIGS. 11B, 11C, and 11D are modifications of the tactile sense providing module.

In each of FIGS. 11A, 11B, 11C, and 11D, contact surfaces of the base member and the tactile sense providing layer are indicated using bold lines, and denoted by reference numeral 10,10A, 10B,10C. Further, FIGS. 11A, 11B, 11C, and 11D each schematically illustrate the tactile sense providing film in a flat form, and each illustrate the wall-formed base-member-fixed portion having a simple shape. Further, FIGS. 12A, 12B, 12C, 12D, and 12E described later each also illustrate the wall-formed base-member-fixed portion having a simple shape.

As illustrated in FIG. 11A, in the tactile sense providing module 3 according to the embodiments described above, the tactile sense providing layer 4 is arranged to cover the base member 5, and the tactile sense providing layer 4 is bonded to be fixed to the base member 5 by being brought into contact with the base member 5 on two different pairs of contact surfaces 10, the two different pairs of contact surfaces 10 respectively corresponding to the inner wall surface 421 and the bottom surface 423 of the wall-formed base-member-fixed portion 42. However, the present technology is not limited to such a configuration.

For example, the tactile sense providing layer 4 may be arranged to cover a base member 5B, and may be bonded to be fixed to each other by the inner wall surface 421 of the wall-formed base-member-fixed portion 42 and a side surface 52B of the base member 5B being brought into contact with each other, that is, may be bonded to be fixed to each other on a pair of contact surfaces 10B, as in the case of a tactile sense providing module 3B illustrated in FIG. 11B. In the tactile sense providing module 3B, the contact surfaces 10B of the tactile sense providing layer 4 and the base member 5B are substantially parallel to the tactile-sense-provision direction (the height direction Z in the present embodiment). This makes it possible to make a range of the tactile sense providing film larger in proportion to the size of the entirety of the tactile sense providing module 3, and thus an effective area in which a tactile sense can be provided can be made larger.

Further, for example, the tactile sense providing layer 4 and a base member 5C may be bonded to be fixed to each other by the bottom surface 423 of the wall-formed base-member-fixed portion 42 and a front surface (a skin-side surface) 51C of the base member 5B being brought into contact with each other, that is, may be bonded to be fixed to each other on a pair of contact surfaces 10C, as in the case of a tactile sense providing module 3C illustrated in FIG. 11C. In the tactile sense providing module 3C, the contact surfaces 10C of the tactile sense providing layer 4 and the base member 5C are surfaces that are substantially vertical to the tactile-sense-provision direction.

Furthermore, the tactile sense providing layer 4 may be arranged to be situated inward of a wall 52D that is provided along the entirety of a peripheral edge of a base member 5D, as in the case of a tactile sense providing module 3D illustrated in FIG. 11D. In the tactile sense providing module 3D, the tactile sense providing layer 4 is fixed to the base member 5 by being brought into contact with the base member 5 on two different pairs of contact surfaces, the two different pairs of contact surfaces respectively corresponding to the outer wall surface 422 and the bottom surface 423 of the wall-formed base-member-fixed portion 42. In other words, the tactile sense providing layer 4 and the base member 5 are bonded to be fixed to each other on two different pairs of contact surfaces 10D.

Figure 12A:
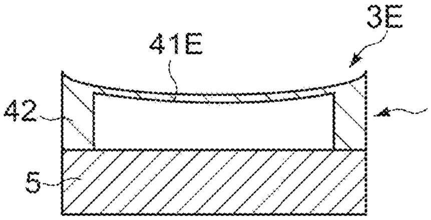
FIGS. 12A, 12B, 12C, 12D, and 12E are schematic cross-sectional views of tactile sense providing modules according to other modifications.
Figure 12D:
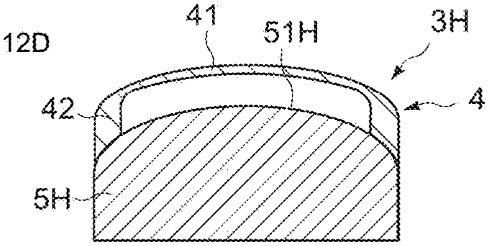
Figure 12B:
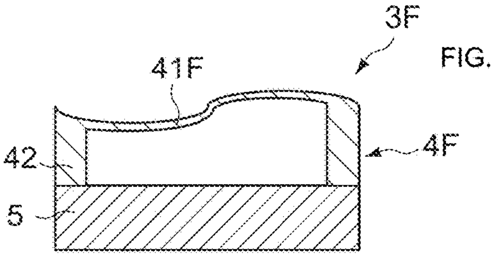
Figure 12E:
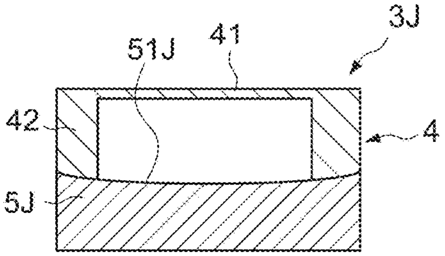
Figure 12C:
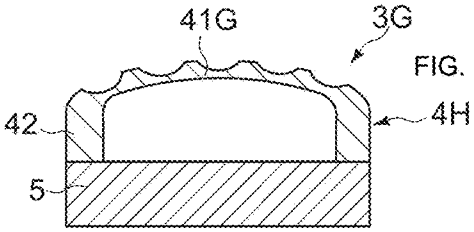

FIGS. 12A, 12B, and 12C are other modifications of the tactile sense providing module.

In the tactile sense providing module 3 according to the embodiments described above, the tactile sense providing film 41 of the tactile sense providing layer 4 is convex toward a skin of a tactile-sense-provision-target body part (toward the outer side in the height direction Z). However, the present technology is not limited thereto. The shape of the tactile sense providing film can be set as appropriate according to the application of the tactile sense providing apparatus or according to a tactile-sense-provision-target body part. A change in the shape of the tactile sense providing film makes it possible to provide more various tactile senses.

For example, a tactile sense providing film 41E may be concave by being recessed toward the inner side in the height direction Z, as in the case of a tactile sense providing module 3E illustrated in FIG. 12A.

Further, for example, a tactile sense providing film 41F may have an uneven shape, as in the case of a tactile sense providing module 3F illustrated in FIG. 12B.

The example in which the entirety of the tactile sense providing film 41 has a uniform thickness has been described in the embodiments and modifications above. However, a tactile sense providing film 41G may have a nonuniform thickness in a plane, where convex portions are regularly or irregularly situated on a surface of the tactile sense providing film 41G, as in the case of a tactile sense providing module 3G illustrated in FIG. 12C.

FIGS. 12D and 12E are yet other modifications of the tactile sense providing module.

The example in which the base 51 of the base member 5 forming the space 7 includes a planar surface has been described for the tactile sense providing module 3 according to the embodiments above. However, the present technology is not limited thereto.

A shape of a surface of the base member that contributes toward forming the space can be set as appropriate according to the application of the tactile sense providing apparatus or according to a tactile-sense-provision-target body part.

For example, a base 51H that is included in a base member 5H and contributes toward forming a space 7H may be convex toward the skin (toward the outer side in the height direction Z), as in the case of a tactile sense providing module 3H illustrated in FIG. 12D.

Further, a base 51J that is included in a base member 5J and contributes toward forming a space 7J may be concave by being recessed toward the inner side in the height direction Z, as in the case of a tactile sense providing module 3J illustrated in FIG. 12E.

FIG. 12E is a schematic cross-sectional view of a tactile sense providing apparatus 1K according to a modification. The tactile sense providing apparatus 1K includes a tactile sense providing module 3K, and a housing 2K that accommodates therein the tactile sense providing module 3K. The tactile sense providing module 3K includes a base member 5K, and a tactile sense providing layer 4K that forms a space 7K together with the base member 5K. The tactile sense providing layer 4K includes a tactile sense providing film 41K and a wall-formed base-member-fixed portion 42K.

Figure 12F:
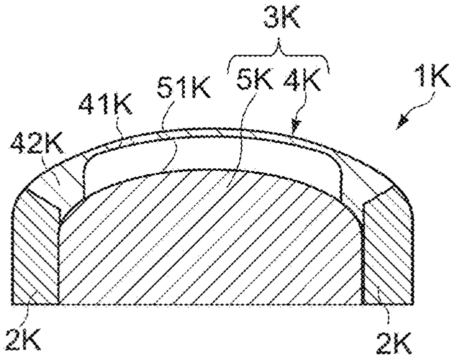
FIG. 12F is a schematic cross-sectional view of a tactile sense providing apparatus according to another modification.

As illustrated in FIG. 12F, the tactile sense providing apparatus 1K may be configured such that a portion around a boundary of the tactile sense providing film 41K and the housing 2K includes a continuous smooth surface. This makes it possible to obtain the tactile sense providing apparatus 1K exhibiting a uniformity in overall appearance.

Figure 13A:
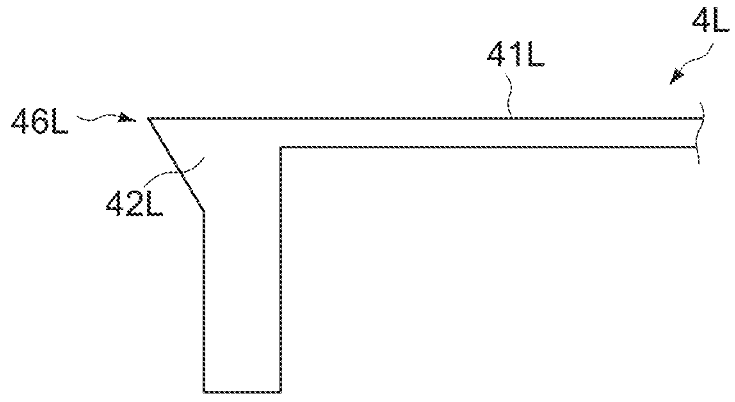
FIGS. 13A, 13B, and 13C are set of schematic partial cross-sectional views of tactile sense providing layers according to yet other modifications.
Figure 13B:
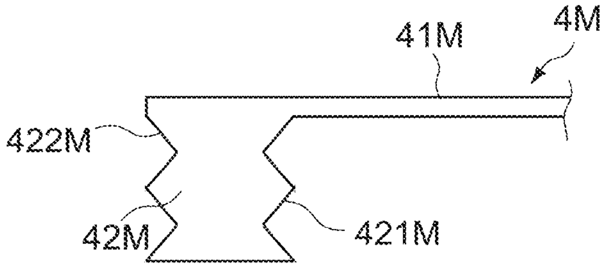
Figure 13C:
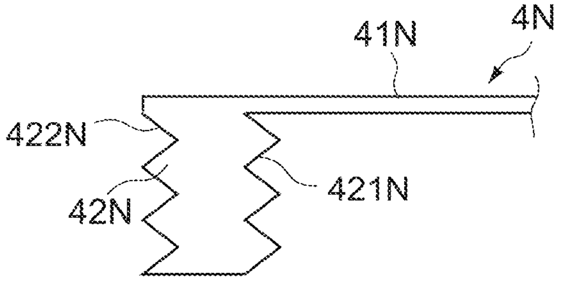

FIGS. 13A, 13B, and 13C are other modifications of the tactile sense providing layer that is a portion of the tactile sense providing module.

In the tactile sense providing module 3 according to the embodiments described above, the protrusion 46 provided to the wall-formed base-member-fixed portion 42 of the tactile sense providing layer 4 is slightly rounded, as illustrated in FIG. 8. The present technology is not limited thereto, and a wall-formed base-member-fixed portion 42L may include a protrusion 46L that protrudes at an acute angle, as in the case of a tactile sense providing layer 4L illustrated in of FIG. 13A.

Further, in the tactile sense providing module 3 according to the embodiments described above, the inner wall surface 421 of the wall-formed base-member-fixed portion 42 of the tactile sense providing layer 4 is a substantially flat surface, as illustrated in FIG. 8. However, as in the case of a tactile sense providing layer 4M illustrated in FIG. 13B and a tactile sense providing layer 4N illustrated in FIG. 13C, an inner wall surface 421M of a base-member-fixed portion 42M and an inner wall surface 421N of a base-member-fixed portion 42N may also be pleated uneven surfaces. In addition, outer wall surfaces 422M and 422N of the base-member-fixed portions 42M and 42N may also be pleated uneven surfaces.

Third Embodiment

FIG. 14 is a schematic cross-sectional view of a tactile sense providing module 3P according to a third embodiment.

The example in which the base member and the tactile sense providing layer are bonded using an adhesive to be fixed to each other has been described in the embodiments above. However, a base member 5P and a tactile sense providing layer 4P may be mated using a screw structure to be fixed to each other, as in the case of the tactile sense providing module 3P according to the present embodiment that is illustrated in FIG. 14.

As illustrated in FIG. 14, the tactile sense providing module 3P includes the base member 5P, and the tactile sense providing layer 4P forming a space 7P together with the base member 5P. The tactile sense providing layer 4P includes a tactile sense providing film 41P and a wall-formed base-member-fixed portion 42P.

Each of an inner wall surface 421P of the wall-formed base-member-fixed portion 42P of the tactile sense providing layer 4P and a side surface 52P of the base member 5 is substantially perfectly circular in the plan view. Screw threads are respectively formed on the inner wall surface 421P of the base-member-fixed portion 42P and on the side surface 52P of the base member 5P, and the tactile sense providing layer 4P and the base member 5P are fixed to each other by the respective screw threads being engaged with each other.

As described above, the tactile sense providing layer and the base member may be fixed to each other using a screw structure. The fixation performed using a screw structure makes it possible to easily separate the tactile sense providing layer from the base member even if the tactile sense providing layer or the base member has a failure after the tactile sense providing module is formed. This makes it possible to easily replace parts and to reuse the tactile sense providing layer or base member having no failure.

<Other Modifications of Tactile Sense Providing Apparatus>

The examples of the configuration of the contact surfaces of the base member and the tactile sense providing layer that are illustrated in FIGS. 11A, 11B, 11C, and 11D, the examples of the shape of the tactile sense providing film that are illustrated in FIGS. 8, 12A, 12B, and 12C, the examples of the shape of the base of the base member that are illustrated in FIGS. 12D and 12E, the example of the appearance of the tactile sense providing apparatus that is illustrated in FIG. 12F, the examples of the shape of the base member that are illustrated in FIGS. 13A, 13B and 13C, and the example of mating performed using a screw structure that is illustrated in FIG. 14 can be used in combination as appropriate.

Further, the example in which the tactile sense providing apparatus includes a pressure sensor has been described for the tactile sense providing apparatus according to the embodiments described above. However, the tactile sense providing apparatus may include no pressure sensor.

Further, an atmospheric-pressure sensor may be arranged in the space formed by the base member and the tactile sense providing layer in the tactile sense providing module of the tactile sense providing apparatus. The atmospheric-pressure sensor measures pressure in the space.

A result of the measurement performed by the atmospheric-pressure sensor can be used to control a force of a tactile-sense stimulus.

Furthermore, the use of an atmospheric-pressure sensor makes it possible to perform control such that a degree of expansion is in a desired range, in order for the tactile sense providing film not to explode due to the tactile sense providing layer overexpanding upon inflow of fluid. As described above, an atmospheric-pressure sensor can be used as a limiter, and this makes it possible to enhance safety in use.

Further, the tactile sense providing module may include a functional element such as a Peltier element (a thermoelectric conversion element), as described above. However, the tactile sense providing module may include, for example, a lite-emitting diode (LED) as another functional element. The LED can be arranged in the space in the tactile sense providing module. The use of an LED makes it possible to provide not only a tactile sense, but also a sense of sight such as emission of light upon expansion of the tactile sense providing layer.

Furthermore, a degree of sensitivity to provision of a sense of pressure differs depending on an age of the user U. Thus, the age may be set upon initial setting before use, and a minor adjustment of a degree of pressure may be made according to the age. Likewise, a degree of sensitivity to provision of senses of warmth and coldness differs depending on the age of the user U. Thus, when a thermoelectric conversion element is provided to the tactile sense providing apparatus, the age may be set upon initial setting before use, and a minor adjustment of degrees of warmth and coldness may be made according to the age.

<Other Examples of Applying Tactile Sense Providing Apparatus>

For example, a grandchild can promote communication with his/her grandparents in a remote place using a tactile sense providing apparatus in the example of applying tactile sense providing apparatus described in the embodiments above.

Moreover, a speaker such as a singer grasps a tactile sense providing apparatus in a concert hall, and this makes it possible to provide the feel of the grasp to a plurality of audience members through tactile sense providing apparatuses respectively held by the plurality of audience members. Further, when the audience members of the plurality of audience members grasp the respective tactile sense providing apparatuses, this makes it possible to understand, for example, excitement, for example, at a concert.

Further, the use of the tactile sense providing apparatus 1 makes it possible to remotely participate in a handshake session of a famous person to shake hands with the famous person. This also results in being able to enhance the security.

As described above, a tactile sense can also be provided to a plurality of persons at the same time using tactile sense providing apparatuses respectively held by the plurality of persons, on the basis of a detection result detected by a single tactile sense providing apparatus.

Further, the tactile sense providing apparatus according to the present technology can be used in various applications. For example, when the tactile sense providing apparatus is used in, for example, a virtual reality (VR) apparatus or an augmented reality (AR) apparatus, this makes it possible to provide a tactile sense that causes a user to feel as if the user is actually in touch with a virtual object.

Typically, the tactile sense providing apparatus can be used for any purpose of providing a tactile sense to a user, such as being used in a wearable apparatus, an input apparatus, a medical apparatus, a simulation apparatus, or an entertainment apparatus.

Furthermore, a shape of the tactile sense providing apparatus can be set as appropriate according to the application of the tactile sense providing apparatus. Specific examples of applying the tactile sense providing apparatus and specific examples of the configuration of the tactile sense providing apparatus are described below with reference to FIGS. 15A, 15B, 15C, 15D, 16A, 16B, 16C, 17A, and 17B, although the present technology is not limited to the examples described below.

FIGS. 15A, 15B, 15C, and 15D respectively illustrate holdable tactile sense providing apparatuses 1Q to 1T.

The tactile sense providing apparatus 1Q illustrated in FIG. 15A is used by being held with one hand, and the plane shape of the tactile sense providing layer 4 of the tactile sense providing module 3 is substantially rectangular.

The tactile sense providing apparatus 1R illustrated in FIG. 15B is spheric, and includes three tactile sense providing modules 3 of which the tactile sense providing layers 4 are exposed along a surface of the tactile sense providing apparatus 1R.

FIG. 15C illustrates an example in which the tactile sense providing modules 3 are provided to a wheel and the wheel also serves as the tactile sense providing apparatus 1S. The tactile sense providing modules 3 are arranged such that the tactile sense providing layers 4 are exposed in regions, in the tactile sense providing apparatus 1S, that are held by the user U with his/her hands.

FIG. 15D illustrates an example in which the tactile sense providing module 3 is provided to a game controller and the game controller also serves as the tactile sense providing apparatus 1T. The tactile sense providing modules 3 are arranged such that the tactile sense providing layers 4 are exposed in regions, in the tactile sense providing apparatus 1T, that are held by the user U with his/her hands. For example, the user U holds the tactile sense providing apparatus 1T corresponding to a game controller, and can play a game while viewing a display of, for example, a TV apparatus. The tactile sense providing apparatus 1T provides a tactile sense to the user U according to a game video displayed on the display. This enables game play that provides a sense of realism.

Figure 16A:
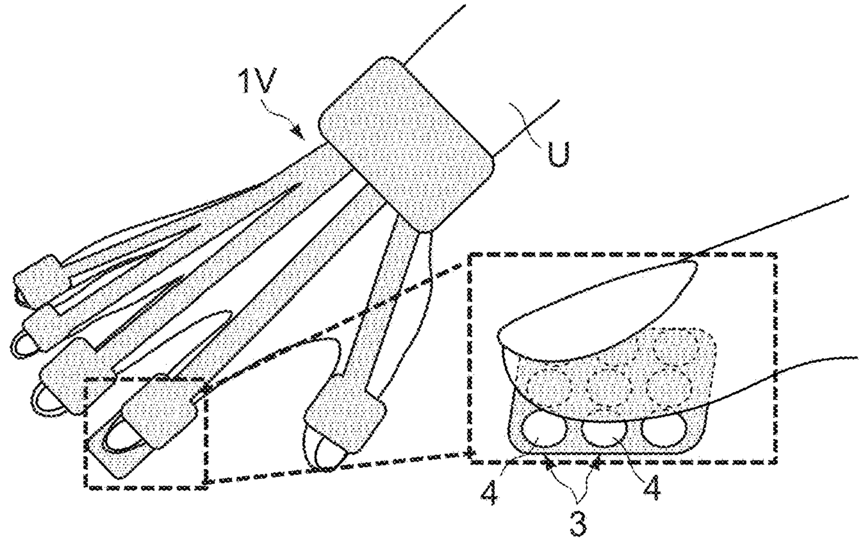
FIGS. 16A, 16B, and 16C are diagrams used to describe examples of applying tactile sense providing apparatuses.
Figure 16B:
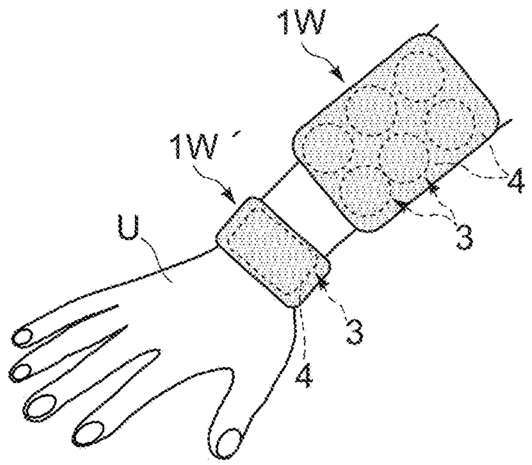
Figure 16C:
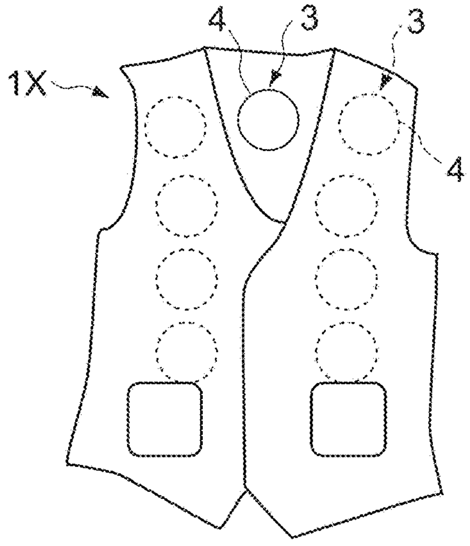

FIGS. 16A, 16B, and 16C respectively illustrate wearable tactile sense providing apparatuses 1V to 1X.

The tactile sense providing apparatus 1V illustrated in FIG. 16A provides a tactile sense to five fingertips of a hand when the tactile sense providing apparatus 1V is worn on the hand. The tactile sense providing modules 3 are arranged such that a plurality of tactile sense providing layers 4 is in contact with each of the five fingertips of the user U when the tactile sense providing apparatus 1V is worn on the hand.

The tactile sense providing apparatuses 1W and 1W' illustrated in FIG. 16B are wristband-type tactile sense providing apparatuses that can provide tactile senses to an arm and a wrist, respectively. The tactile sense providing modules 3 are arranged such that the tactile sense providing layers 4 are in contact with the arm and the wrist when the tactile sense providing apparatuses 1W and 1W' are worn on the arm and the wrist.

The tactile sense providing apparatus 1X illustrated in FIG. 16C is a vest-type tactile sense providing apparatus that can be worn on an upper body of a user and provides a tactile sense to the upper body. The tactile sense providing modules 3 are arranged such that a plurality of tactile sense providing layers 4 is in direct contact with a skin of the upper body or is in contact with the skin of the upper body through clothes when the tactile sense providing apparatus 1X is worn on the upper body.

Figure 17A:
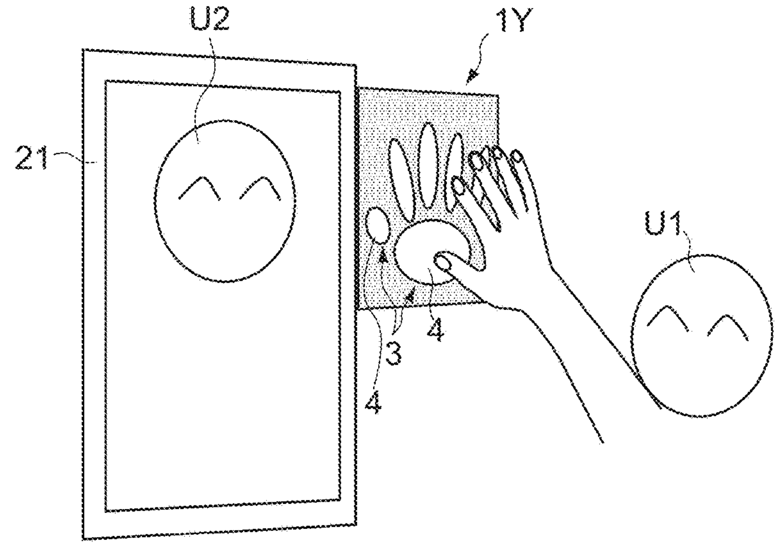
FIGS. 17A and 17B are diagrams used to describe examples of applying tactile sense providing apparatuses.
Figure 17B:
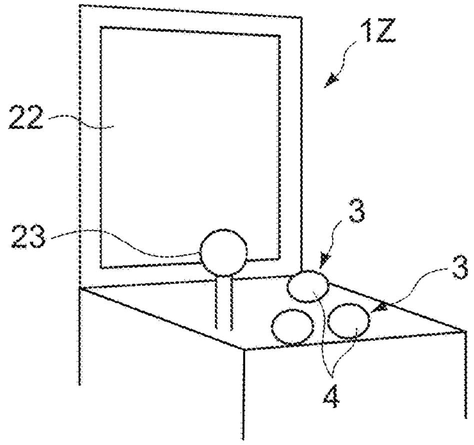

FIGS. 17A and 17B respectively illustrate installation-type tactile sense providing apparatuses 1Y and 1Z.

The tactile sense providing apparatus 1Y illustrated in FIG. 17A is installed near a display 21. The tactile sense providing apparatus 1Y includes a plurality of tactile sense providing modules 3 respectively including the tactile sense providing layers 4 arranged to be formed into a shape of a hand. The tactile sense providing apparatus 1Y provides a tactile sense on the basis of movement of a hand of the user U2 displayed on the display 21. The user U1 who is viewing the display 21 can feel the movement of the hand of the user U2 by placing his/her hand on the tactile sense providing apparatus 1Y.

FIG. 17B illustrates an example in which the tactile sense providing module 3 is provided to a game stand that includes a display 22 and a game controller 23, and the game stand also serves as the tactile sense providing apparatus 1Z. A plurality of tactile sense providing modules 3 is installed near the game controller 23 fixed to the game stand, and the tactile sense providing layer 4 of each of the tactile sense providing modules 3 is exposed. The tactile sense providing apparatus 1Z can provide a tactile sense to a hand of a user by the user placing his/her hand on the tactile sense providing layer 4 to directly touch the tactile sense providing layer 4.

<Others>

The embodiments of the present technology have been described above. The present technology is not limited to the embodiments described above, and of course various modifications may be made thereto without departing from the scope of the present technology.

The present technology may also take the following configurations.

(1) A tactile sense providing apparatus, including:
 - a base member that includes a fluid-inlet-and-outlet opening; and
 - a tactile sense providing layer that forms a space between the base member and the tactile sense providing layer, the space accommodating therein fluid that flows into and out of the space through the fluid-inlet-and-outlet opening,
 - the tactile sense providing layer including
   - a tactile sense providing film that is deformed in response to the inflow or outflow of the fluid, and
   - a wall-formed base-member-fixed portion that is fixed to the base member and surrounds the tactile sense providing film,
 - the base-member-fixed portion exhibiting a lower rate of deformation caused between before and after the fluid flows into the space than the tactile sense providing film.

(2) The tactile sense providing apparatus according to (1), in which
 - the space is formed by the base member, the tactile sense providing film, and the base-member-fixed portion.

(3) The tactile sense providing apparatus according to (2), in which
 - a portion of the wall-formed base-member-fixed portion that forms the space is thicker than the tactile sense providing film.

(4) The tactile sense providing apparatus according to any one of (1) to (3), in which
the tactile sense providing layer is formed by integral molding.

(5) The tactile sense providing apparatus according to any one of (1) to (4), in which
the tactile sense providing layer is bonded to be fixed to the base member by an inner wall surface of the wall-formed base-member-fixed portion and the base member being brought into contact with each other.

(6) The tactile sense providing apparatus according to (5), in which
the tactile sense providing layer is bonded to be fixed to the base member by a bottom surface of the wall-formed base-member-fixed portion and the base member being brought into contact with each other.

(7) The tactile sense providing apparatus according to any one of (1) to (6), in which
the base member includes a hole in a contact region in which the base member and the wall-formed base-member-fixed portion are in contact with each other, and
the base member and the wall-formed base-member-fixed portion are fixed to each other using an adhesive provided to the contact region.

(8) The tactile sense providing apparatus according to any one of (1) to (3), further including
a housing that accommodates therein a tactile sense providing module that includes the base member and the tactile sense providing layer, in which
the wall-formed base-member-fixed portion includes a protrusion that protrudes outward in a direction of a thickness of the wall-formed base-member-fixed portion, the protrusion determining positions of the housing and the tactile sense providing module.

(9) The tactile sense providing apparatus according to (8), in which
the tactile sense providing apparatus includes a plurality of the tactile sense providing modules, and
the housing accommodates therein the plurality of the tactile sense providing modules.

(10) The tactile sense providing apparatus according to any one of (1) to (4), in which
the wall-formed base-member-fixed portion and the base member are mated to each other using a screw structure.

(11) A tactile sense providing layer that is used in a tactile sense providing apparatus that includes a base member that includes a fluid-inlet-and-outlet opening, and the tactile sense providing layer forming a space between the base member and the tactile sense providing layer, the space accommodating therein fluid that flows into and out of the space through the fluid-inlet-and-outlet opening, the tactile sense providing layer including, in a state of being included in the tactile sense providing apparatus:
a tactile sense providing film that is deformed in response to the inflow or outflow of the fluid; and
a wall-formed base-member-fixed portion that is fixed to the base member and surrounds the tactile sense providing film,
the base-member-fixed portion exhibiting a lower rate of deformation caused between before and after the fluid flows into the space than the tactile sense providing film.

REFERENCE SIGNS LIST

1, 1A, 1Q to 1T, 1V to 1Z, 1W' tactile sense providing apparatus
2, 2A housing
3, 3B to 3H, 3J, 3K, 3P, 103 tactile sense providing module
4, 4E to 4G, 4K to 4N, 4P, 104 tactile sense providing layer
41, 41E to 41G, 41K to 41N, 41P tactile sense providing film
42, 42K to 42N, 42P wall-formed base-member-fixed portion
421, 421M, 421N, 421P inner wall surface
423 bottom surface
46 protrusion
5 base member
53 fluid-inlet-and-outlet opening
U, U1, U2 user

The invention claimed is:

1. A tactile sense providing apparatus, comprising:
a base member that includes a fluid-inlet-and-outlet opening; and
a tactile sense providing layer, wherein
a space between the base member and the tactile sense providing layer includes fluid that flows into and out of the space through the fluid-inlet-and-outlet opening, and
the tactile sense providing layer includes:
a tactile sense providing film that deforms based on the flow of the fluid, wherein the flow of the fluid includes inflow and outflow of the fluid through the space; and
a wall-formed base-member-fixed portion fixed to the base member, wherein
the wall-formed base-member-fixed portion surrounds an entire circumference of the tactile sense providing film,
the wall-formed base-member-fixed portion exhibits a first rate of deformation based on the flow of the fluid into the space,
the tactile sense providing film exhibits a second rate of deformation based on the flow of the fluid into the space, and
the first rate of deformation of the wall-formed base-member-fixed portion is lower than the second rate of deformation of the tactile sense providing film.

2. The tactile sense providing apparatus according to claim 1, wherein the space is between the base member, the tactile sense providing film, and the wall-formed base-member-fixed portion.

3. The tactile sense providing apparatus according to claim 2, wherein a portion of the wall-formed base-member-fixed portion that forms the space is thicker than the tactile sense providing film.

4. The tactile sense providing apparatus according to claim 1, wherein the tactile sense providing film is integrally molded with the wall-formed base-member-fixed portion.

5. The tactile sense providing apparatus according to claim 1, wherein the tactile sense providing layer is fixed to the base member based on a contact of an inner wall surface of the wall-formed base-member-fixed portion and the base member.

6. The tactile sense providing apparatus according to claim 5, wherein the tactile sense providing layer is fixed to the base member based on a contact of a bottom surface of the wall-formed base-member-fixed portion and the base member.

7. The tactile sense providing apparatus according to claim 1, wherein the base member includes a hole in a contact region, the base member is in contact with the wall-formed base-member-fixed portion in the contact region, and the base member is fixed to the wall-formed base-member-fixed portion by an adhesive that is in the contact region.

8. The tactile sense providing apparatus according to claim 1, further comprising a housing that accommodates a tactile sense providing module, wherein the tactile sense providing module includes the base member and the tactile sense providing layer, the wall-formed base-member-fixed portion includes a protrusion that protrudes outward in a direction of a thickness of the wall-formed base-member-fixed portion, and the protrusion determines positions of the housing and the tactile sense providing module.

9. The tactile sense providing apparatus according to claim 8, wherein the tactile sense providing apparatus comprises a plurality of tactile sense providing modules, the plurality of tactile sense providing modules includes the tactile sense providing module, and the housing accommodates the plurality of tactile sense providing modules.

10. The tactile sense providing apparatus according to claim 1, wherein the wall-formed base-member-fixed portion is mated to the base member based on a screw structure.

11. A tactile sense providing layer, comprising:

a tactile sense providing film, wherein the tactile sense providing layer is in a tactile sense providing apparatus, the tactile sense providing apparatus includes a base member that includes a fluid-inlet-and-outlet opening, a space between the base member and the tactile sense providing layer includes fluid that flows into and out of the space through the fluid-inlet-and-outlet opening, and the tactile sense providing film deforms based on the flow of the fluid, wherein the flow of the fluid includes inflow and outflow of the fluid through the space; and a wall-formed base-member-fixed portion fixed to the base member, wherein the wall-formed base-member-fixed portion surrounds an entire circumference of the tactile sense providing film, the wall-formed base-member-fixed portion exhibits a first rate of deformation based on the flow of the fluid into the space, the tactile sense providing film exhibits a second rate of deformation based on the flow of the fluid into the space, and the first rate of deformation of the wall-formed base-member-fixed portion is lower than the second rate of deformation of the tactile sense providing film.

* * * * *